(12) United States Patent
Sottos et al.

(10) Patent No.: US 10,640,674 B2
(45) Date of Patent: May 5, 2020

(54) AUTONOMIC DAMAGE INDICATION IN COATINGS

(71) Applicant: The Board of Trustees of the University of Illinois, Urbana, IL (US)

(72) Inventors: Nancy R. Sottos, Champaign, IL (US); Scott R. White, Champaign, IL (US); Wenle Li, Urbana, IL (US); Christopher C. Matthews, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 16/241,343

(22) Filed: Jan. 7, 2019

(65) Prior Publication Data

US 2019/0144705 A1  May 16, 2019

Related U.S. Application Data

(62) Division of application No. 15/366,184, filed on Dec. 1, 2016, now Pat. No. 10,174,221.

(60) Provisional application No. 62/263,401, filed on Dec. 4, 2015.

(51) Int. Cl.

| | | |
|---|---|---|
| *C09D 163/00* | (2006.01) | |
| *C09D 5/00* | (2006.01) | |
| *C09D 7/41* | (2018.01) | |
| *C09D 7/40* | (2018.01) | |
| *C08K 9/10* | (2006.01) | |

(52) U.S. Cl.
CPC .......... *C09D 163/00* (2013.01); *C09D 5/00* (2013.01); *C09D 7/41* (2018.01); *C09D 7/70* (2018.01); *C08K 9/10* (2013.01)

(58) Field of Classification Search
CPC .......... C09D 163/00; C09D 5/00; C09D 7/40; C09D 7/41; C09D 7/70; C08K 9/10
See application file for complete search history.

(56) References Cited

U.S. PATENT DOCUMENTS

| | | |
|---|---|---|
| 3,469,439 A | 9/1969 | Roberts et al. |
| 4,793,977 A | 12/1988 | Morris |
| 8,846,404 B2 | 9/2014 | Odom et al. |
| 8,980,381 B2 | 3/2015 | Graham et al. |
| 2007/0197383 A1 | 8/2007 | Koene et al. |
| 2007/0197393 A1 | 8/2007 | Witschel et al. |
| 2011/0104495 A1 | 5/2011 | Lalgudi et al. |
| 2011/0287553 A1 | 11/2011 | Hassan et al. |
| 2015/0137416 A1 | 5/2015 | Patrick et al. |

OTHER PUBLICATIONS

Augustyniak et al., "Early Detection of Steel Corrosion via "Turn-On" Fluorescence in Smart Epoxy Coatings," ACS Appl Mater Interfaces., 1(11):2618-2623, Nov. 2009.
Caruso et al., "Robust, Double-Walled Microcapsules for Self-Healing Polymeric Materials," ACS Appl. Mater. Interfaces, 2(4):1195-1199, Apr. 2010.
Celestine et al., "Fracture-Induced Activation in Mechanophore-Linked Rubber Toughened PMMA," Polymer, 55 (16):4164-4171, Aug. 2014.
Cho et al., "A Fluorescent Crack Sensor Based on Cyclobutane-Containing Crosslinked Polymers of Tricinnamates," Sensor Actuat B-Chem., 134(2):822-825, Sep. 2008.
Cohen Stuart et al., "Emerging Applications of Stimuli-Responsive Polymer Materials," Nat Mater., 9(2):101-113, Feb. 2010.
Dailey et al., "A Self-Healing Biomaterial Based on Free-Radical Polymerization," J Biomed Mater Res A., 102 (9):3024-3032, Sep. 2014.
Davis et al., "Force-Induced Activation of Covalent Bonds in Mechanoresponsive Polymeric Materials," Nature, 459 (7243):68-72, May 2009.
Di Credico et al., "Microencapsulation of a UV-Responsive Photochromic Dye by Means of Novel UV-Screening Polyurea-Based Shells for Smart Coating Applications," ACS Appl Mater Interfaces., 5(14):6628-6634, Jul. 2013.
Kolthoff et al., "The Use of Dichlorofluorescein as an Adsorption Indicator for the Argentometric Titration of Chlorides," J. Am. Chem. Soc., 51(11):3273-3277, Nov. 1929.
Li et al., "Autonomous Indication of Mechanical Damage in Polymeric Coatings," Adv Mater., 28(11):2189-2194, Mar. 2016.
Odom et al., "Visual Indication of Mechanical Damage Using Core-Shell Microcapsules," ACS Appl Mater Interfaces., 3(12):4547-4551, Dec. 2011.
Pang et al., "A Hollow Fibre Reinforced Polymer Composite Encompassing Self-Healing and Enhanced Damage Visibility," Compos Sci Technol., 65(11-12):1791-1799, Sep. 2005.
Patrick et al., "Continuous Self-Healing Life Cycle in Vascularized Structural Composites," Adv Mater., 26 (25):4302-4308, Jul. 2014.
Song et al., "Fluorescence Sensing of Microcracks Based on Cycloreversion of a Dimeric Anthracene Moiety," J Mater Chem., 22(4):1380-1386, Jan. 2012.
Stoddart A., "Polymers: Colour in the Cracks," Nat Rev Mater., 1:1, Feb. 2016.
Toohey et al., "Self-Healing Materials with Microvascular Networks," Nat Mater., 6(8):581-585, Aug. 2007.

(Continued)

*Primary Examiner* — Irina S Zemel
(74) *Attorney, Agent, or Firm* — Haukaas Fortius PLLC; Michael H. Haukaas

(57) ABSTRACT

Autonomous detection of damage in a polymer coating is described by utilizing microcapsules in a polymer coating having free and/or residual amines. The microcapsules contain a color indicator, such as 2',7'-dichlorofluorescein (DCF), bromophenol blue (BPB) or fluorescamine, which is reactive with the free and/or residual amines present in the polymer coating. For coatings without the presence of free and/or residual amines, a color indicator microcapsule can be combined with a second type of microcapsule filled with a base. When sufficient damage is inflicted to the coating, the microcapsules in and/or around an area of the damage will rupture, and the color indicator will react with the free and/or residual amines or the base to autonomically indicate the area in which the coating has been damaged.

20 Claims, 19 Drawing Sheets

(56) References Cited

OTHER PUBLICATIONS

Van Den Dungen et al., "Use of a Profluorophore for Visualization of the Rupture of Capsules in Self-Healing Coatings," Macromol Rapid Commun., 31(7):625-628, Apr. 2010.
Yao et al., "Fluorescence and Electronic Action Spectroscopy of Mass-Selected Gas-Phase Fluorescein, 2',7'- dichlorofluorescein, and 2',7'-difluorofluorescein Ions," J Phys Chem A., 117(6):1351-1359, Feb. 2014.

(a)

35

(b)

40

(a)

(b)

Damage Indication in Multi-layer Coating System (a)

(b)

Dual-Capsule Indication by Fluorescamine (a)

(b)

Fluorescamine in EPA (c)

Scratch test in coatings (d)

Impact test on composites

AUTONOMIC DAMAGE INDICATION IN COATINGS

RELATED APPLICATIONS

This application is a divisional application of U.S. patent application Ser. No. 15/366,184, filed Dec. 1, 2016, which claims priority under 35 U.S.C. § 119(e) to U.S. Provisional Patent Application No. 62/263,401, filed Dec. 4, 2015, which applications are incorporated herein by reference.

BACKGROUND OF THE INVENTION

Polymeric coatings and composites are commonly used to protect a substrate from wear and environmental exposure. They can be seen in articles of manufacture in the defense, construction, automobile, aerospace and petroleum industries, just to name a few of them. They are particularly useful where high strength, stiffness, low weight, and environmental stability are required. The coatings can be primers, mid-coats or top-coats. Modern coatings are often formulated to include specialized functional or multifunctional agents to improve or provide various different properties of the coating (e.g., indicators of damage, hydrophobicity, ice repellence, anti-fouling, anti-dusting, anti-corrosion, thermo-protection, self-healing, etc.), and are capable of adapting their properties dynamically to an external stimulus. When a functionalized coating is able to sense the environment and make a desired response to the stimulus, the general term smart coating is often assigned to it.

The integrity of a coating can be compromised by many things, such as, fatigue, impact or scratch damage, which can expose the underlying substrate to a corrosive environment. Corrosion reduces the mechanical performance of substrates, which results in timely and expensive repairs. Polymeric coatings are often used to protect a substrate from corrosion damage. Polymeric coatings are susceptible to damage in the form of small cracks, which can be difficult to detect. Even on a small scale, crack damage can significantly compromise the integrity and functionality of polymeric materials. On metal substrates with polymer coatings, corrosion and other forms of environmental degradation will generally initiate at the damage site, compromising the underlying substrate materials. In fiber reinforced polymer composites, small impact damage that is difficult to detect can lead to significant degradation in mechanical performance.

In view of the advances and increased uses of smart coatings, the importance of damage indication has garnered increased importance. Numerous approaches have been studied to indicate damage in polymeric coatings and biomolecules. A wide range of mechanisms for mechanically triggered color change and fluorescence in polymers have been reported, including single molecule turn-on/off fluorescence, mechanochemistry, phase/morphology/defect evolution and embedded capsules. Single molecule optical techniques enable force detection at small length scales, such as studies of cell adhesion and interfaces in biological systems. Biomolecules have also been exploited as mechanophores to reveal microscopic damage in bulk polymeric composites. However, these detection mechanisms are currently restricted to material interfaces and long-term stability is unknown.

Mechanochemically induced color/fluorescence changes have been generated under large strains in bulk polymers. Many of these early mechanophores exhibit a reversible optical change, and therefore, are not promising to detect permanent damage. A few mechanochemical systems have been developed to indicate damage, but performance has been limited by low intensity and potential bleaching of fluorescence. U.S. Pat. No. 8,846,404 describes a self-indicating polymeric coating where damage-induced rupturing of microcapsules initiates a reaction between a charge-transfer donor and a charge-transfer acceptor to form a colored charge-transfer product in the damaged area.

Another strategy reported for damage detection is to store color-changing indicators in isolated capsules or hollow fibers in a polymer matrix. However, these systems are limited by lack of a turn-on mechanism (e.g., the indicator is always "on", fluorescent or colored), low contrast between the indicated region and the intact coating, and poor stability. One reported indication system utilizes two different types of capsules, one type containing crystal violet lactone leuco dye and the second type containing methyl-4-hydroxybenzoate color developer, embedded in a polymer coating with a solid silica gel color developer. This three-component system produces very low contrast color indication for a significant amount of indentation to the coating. The stability and controls (e.g., false positives) for this system is unknown.

Damage detection in coatings and composites is challenging. The damage-sensing smart coatings described above suffer from significant chemical and mechanical limitations, which make them less desirable to use in many situations. Some of the approaches require human or mechanical intervention, additional components (e.g., color developer or catalyst), activation (e.g., UV light) associated with significant external energy, and possess limited life-spans or are limited to modest temperatures. A large number of reported indicating systems employ catalysts or other specialty chemicals, which are often expensive, limited to narrow uses and provide less than ideal results in many situations. Many of these systems are unreliable and limited to special situations and conditions. A lot of these systems suffer from one or more of the following deficiencies: (i) poor color resolution, (iii) lack of versatility (e.g., unstable to certain matrices), (iii) unknown stability, (iv) modest responses and (iv) complicated or expensive processing.

Accordingly, there is a need for improved indicating systems of damage in coatings and composites. New material systems for coatings and composites that autonomously indicate the presence of damage and/or other environmental stresses prior to catastrophic failure of the coating or composite have the potential to decrease costs and enable more reliable operation in the field. In this patent, we describe a novel system to indicate damage in a material. The system is autonomic, self-powered, stable and adaptable to work on a wide variety of coating materials under different environmental conditions.

SUMMARY

We describe herein a single-component microcapsule-based approach for autonomous detection of damage in polymer coatings and composites. In one aspect of the invention, an autonomic self-indicating material is provided comprising a polymer composition having free and/or residual amines and a plurality of first microcapsules having an outer shell and at least a first color indicator encapsulated inside the first microcapsules, where the self-indicating process is autonomically initiated when a region of the material is sufficiently damaged to induce rupturing of one or more of the first microcapsules, which release the color indicator in and/or around the damaged region where it reacts with the free and/or residual amines in the matrix material to form a colored product in and/or around the damaged region.

In one particular embodiment of the invention, the microcapsule delivery concept was demonstrated for an amine-cured epoxy coating that incorporates an encapsulated reporting agent, 2',7'-dichlorofluorescein (DCF). The epoxy coating, though cured, possesses free and/or residual amines. Upon the infliction of sufficient damage to an area of the coating, the microcapsules in and/or around the area of the damage will rupture, and the DCF agent will release into the damaged area and autonomically indicate the area in which the coating has been damaged. An intense, highly localized color change can be seen in the damaged area.

Another embodiment of the invention is a dual-component microcapsule-based system for autonomous detection of damage in polymer coatings and composites, where one type of microcapsule contains a color indicator as described herein and a second type of microcapsule is filled with a base, such as an amine. When the two types of microcapsules rupture due to sufficient damage being inflicted upon an area of the coating, the color indicator and the amine will each release into the damaged area and react together to autonomically indicate that the coating has been damaged. This embodiment is particularly useful for polymer coatings and composites that do not have sufficient levels of free and/or residual amines to react with the color indicator and provides autonomous damage indication in a wide range of different types of polymeric coating materials.

Still another aspect of the invention is a dual-channel vascular delivery system for autonomous detection of damage in polymer coatings and composites, where a polymer matrix (comprising materials that do not react with the indicator) has a vascular network comprising at least two channels, the first channel comprising a color indicator agent, and the second channel comprising a basic agent, such as an amine, where the self-indicating process is autonomically initiated when a region of the material is sufficiently damaged, which causes the two channels to release the color indicator agent and the basic agent in and/or around the damaged region where the two agents react with one another to form a colored product in and/or around the damaged region.

In other embodiments, one or more additional functional agents are added to the systems described herein. For example, a self-healing agent can be added to the single-component microcapsule, dual-component microcapsule or dual-channel microvascular delivery system. When sufficient damage is inflicted on a region of the coating, the injured region turns-on a local color change to indicate the presence of the damage, and the healing agent reacts with the amine (or other hardeners or catalysts that cure the healing agent) to self-repair the damaged region.

In yet another aspect, a secondary color indicator is added to a system having an additional functional agent, such as a self-healing agent. There can be two types of indicator capsules (or channels) or one type of indicator capsule (or channel) that possesses two-step color changes. When a region of the coating is sufficiently damaged, a first local color change is autonomically turned-on to indicate the presence of damage in the region. Then, the damaged region is autonomically self-healed and a second local color change is autonomically turned-on indicating the self-healing of the damaged region.

Other embodiments provide methods of autonomically self-indicating damage in a material after it has been damaged, comprising formulating the single-component microcapsule, dual-component microcapsule or dual-channel vascular delivery system as described herein prior to damage being inflicted upon a region of the material, and observing a color change in the damaged region after the damage has been inflicted. Further embodiments include formulating an additional functional agent, such as a self-healing agent, and a secondary color indicator, in the system and observing the first color indication of the damaged region, the self-healing of the damaged region and the second color indication that the damaged region has been repaired.

In one embodiment, the color indicator is DCF. In another embodiment, the color indicator is bromophenol blue (BPB). In yet another embodiment the color indicator is fluorescamine, which presents blue fluorescence under UV light.

The self-reporting ability of the damage color indicator improves safety and sustainability of materials, enables more reliable operation in the field and reduces inspection costs as no human intervention is required. Moreover, the damage color indicator can be seamlessly combined with one or more functional agents, such as self-healing agents and secondary color indicators, to report and repair damage to the material, and report that the material has been repaired.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
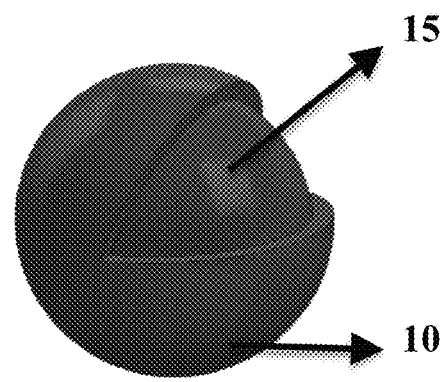
FIG. 1 shows a microcapsule with a cutout to view the interior of the outer shell.

In contrast to reported multi-component-systems (e.g., a reaction based on at least two chemicals used to generate the indicating color), the color indicator system described herein is compatible for a variety of matrix systems and no catalyst or secondary active component is needed. The color indicator system provides an autonomous in situ indication of damage as small as 10 µm in polymer coatings and composites. The color indicator system provides high indicating resolution (e.g., high contrast between the 'on' and 'off' states), rapid response, excellent long-term stability before and after the damage event, sharp color, little to no false positives or bleaching, versatility and cost efficiency.

The indication mechanism is directly responsive to damage inflicted on the material being monitored. The system is very stable and little to no degradation was observed for over many months for both damaged and intact areas of polymer coatings. In one particular embodiment of the invention, the first color indicator is DCF and the polymer composition is an amine-cured epoxy resin coating. The autonomic color change is triggered by a colorimetric reaction of DCF molecules with free and/or residual amines present in the epoxy resin coating. No new polymers are formed. The color change starts immediately (or almost immediately) and rapidly attains a peak intensity (e.g., from about ten seconds to about thirty minutes). The color change is highly stable and remains in and/or around the damaged region. Its intensity depends on the size and concentration of reporter capsules, as well as the size of the damage. Cracks as small as 10 microns can be detected.

One embodiment of the invention provides an autonomic self-indicating material comprising a polymer composition having free and/or residual amines, one or more film-forming binders and a plurality of microcapsules, the microcapsules comprising at least a first color indicator encapsulated within a volume defined by an outer shell of the microcapsules, wherein the self-indicating process is autonomically initiated when a region of the material is sufficiently damaged to cause rupturing of one or more of the microcapsules, which release the first color indicator in and/or around the damaged region where it reacts with the free and/or residual amines to form a colored product in and/or around the damaged region.

The free and/or residual amines in an amine-cured epoxy resin polymer composition provide an alkaline environment with which a first color indicator reacts to form a colored product. Other types of polymer compositions can work, as long as they maintain sufficient free and/or residual amines or other chemical groups that provide alkaline conditions for reacting with the color indicator. For example, polyethylenimine compositions can provide such an alkaline condition. Accordingly, in another embodiment, the polymer composition comprises free and/or residual alkali chemical groups other than amines.

In a dual-component (color indicator/base) microcapsule-based delivery system, the first color indicator reacts with a base to form a colored product. In certain embodiments, the base is an amine or aromatic heterocycle (e.g., imidazole). For example, primary, secondary and cyclic (e.g., piperidine) amines are suitable bases. In particular embodiments of the invention, the first color indicator is DCF, BPB or fluorescamine.

In some embodiments, the system further comprises at least one additional functional agent (e.g., a self-healing or anti-corrosion agent). For example, representative healing agents can be found in U.S. Publication No. 2015/0137416, which is incorporated herein in its entirety. In embodiments having an additional functional agent, the system can further comprise a secondary color indicator to indicate that the additional functional agent has performed its function. In certain embodiments, the secondary color change is not generated by reaction with free and/or residual amines, but rather, is generated by a different mechanism. For example, the secondary color change can be generated by the consumption of free and/or residual amines or by other conventional mechanisms. Neutral Red and other conventional dyes can be appropriate secondary color indicators.

Accordingly, like with the single component first color (e.g., DCF) capsule indicating systems described herein, a dual component (e.g., DCF/amine) capsule indicating system can be combined with other capsule systems to create multi-functional indicating smart coatings. For example, a tri-capsule system can be prepared comprising a self-healing agent (e.g., epoxy resin) capsule, a first color indicator (e.g., DCF) capsule and a base-containing (e.g., amine) capsule. This type of system allows one to prepare multifunctional coatings that not only indicate crack damage, but also self-heal the damage. In further embodiments of the tri-capsule system, a second color indicator (e.g., Neutral Red)

capsule can be added to form a quad-capsule self-reporting system having the ability to autonomously indicate a damage event, heal the damaged area, and provide a secondary indication that the damage had been healed. In another case, the second color indicator need not be sequestered in a separate capsule, but instead, can be loaded within either the base-containing capsules, the healing agent-containing capsules or the first color indicator-containing capsules. Similarly, the first color indicator can be encapsulated together with the self-healing agent. The self-healing process can be realized by polymerization of released healing agents, for example, by a dual-capsule system (e.g., epoxy capsules and amine capsules) or a single capsule system (e.g., epoxy capsules with matrix embedded hardeners/catalysts). In the single capsule system, the base-containing capsules can be replaced by embedding hardeners or other types of catalysts directly into the matrix materials. A skilled artisan can readily envision other types of multi-capsule indicating systems and other combinations of two or more agents encapsulated in one type of capsule. The requirements for such combinations are that the agents (i) are compatible with one another, (ii) do not react within the capsule and (iii) remain active to perform their respective functions when a damage event has occurred.

The autonomous visual indication concept is illustrated in the indicator microcapsule shown in FIG. 1. Part of the capsule wall (outer shell) 10 is cut away to show the indicator agent 15 contained therein. The capsule wall protects the encapsulated agent 15 from a matrix to which it is applied and prior to the capsule being ruptured. When the matrix has been sufficiently damaged (e.g., by fatigue, impact or scratching), the microcapsule ruptures. The indicator agent is released (and de-protected) upon rupturing of the capsule.

Figure 2:
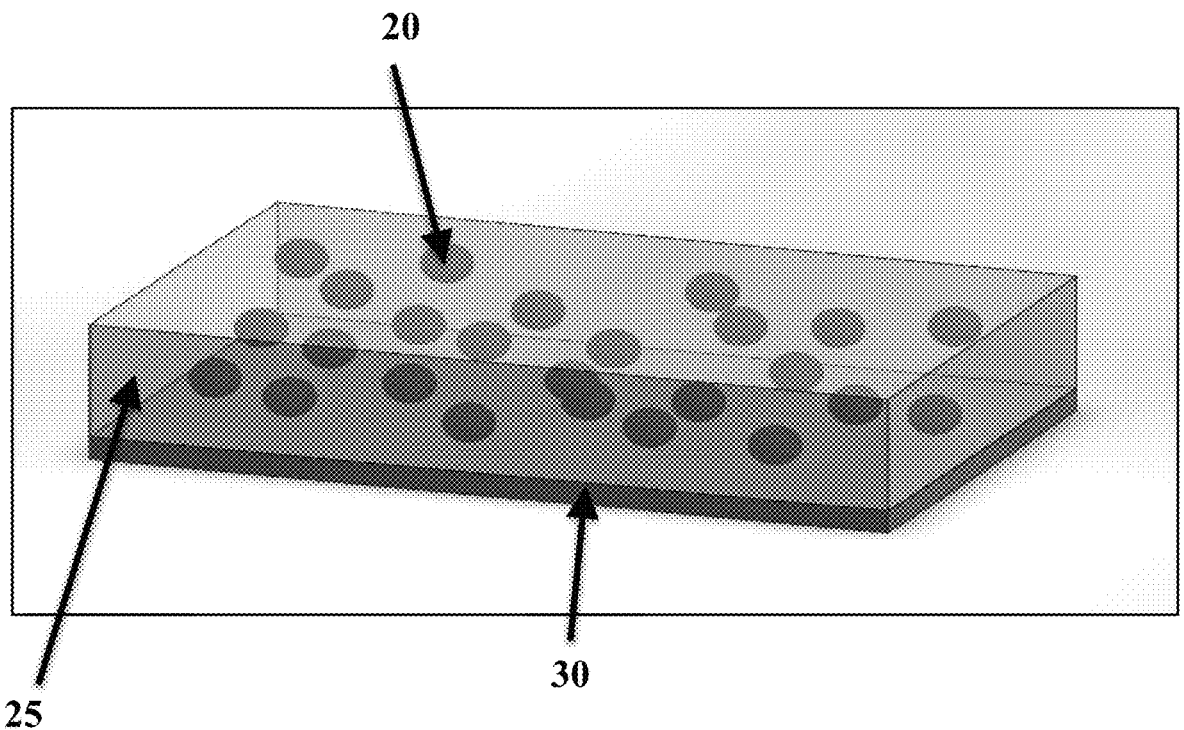
FIG. 2 shows an epoxy coating containing indicator microcapsules on top of a steel substrate.

FIG. 2 shows indicator microcapsules 20 being formulated into a polymer coating 25 and applied onto a substrate 30 before damage has been inflicted to the material. The microcapsules 20 are dispersed throughout the polymer coating 25.

Figure 3:
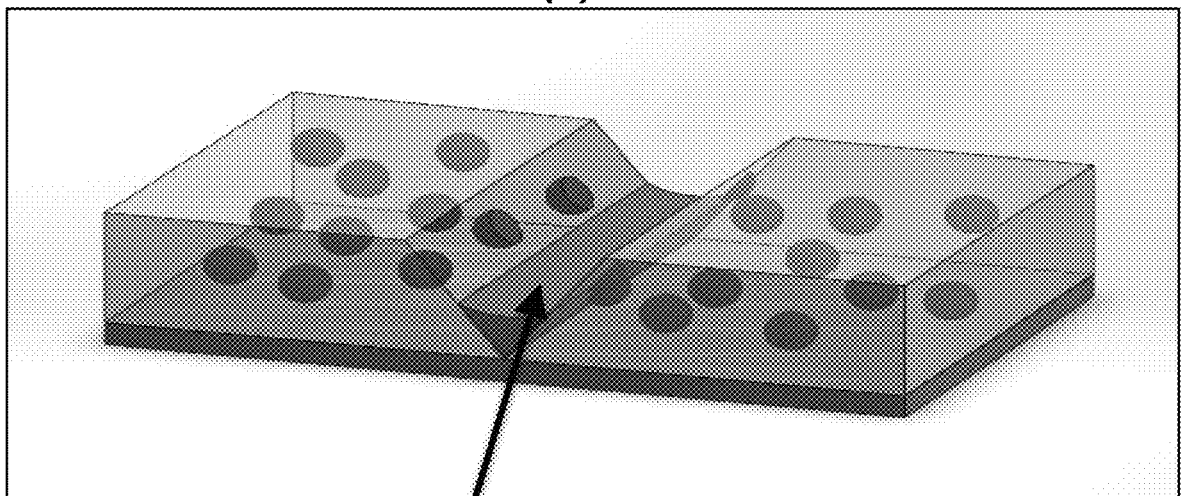
FIG. 3 shows two views of a damaged epoxy coating containing ruptured indicator microcapsules, which color the damaged area.
Figure 3:
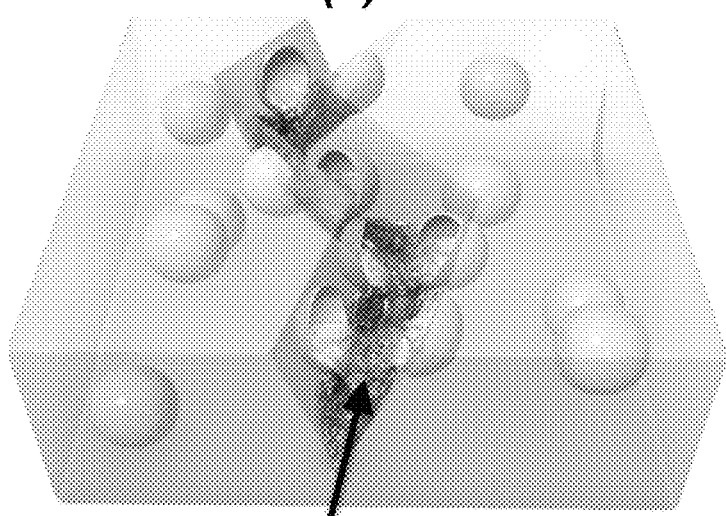

After sufficient (e.g., mechanical) damage has been inflicted to a region of a material, a crack will form in the damaged region and the microcapsules will be ruptured and release the encapsulated agent(s) in the damaged region. This aspect is illustrated in FIG. 3. Microcapsules containing visual indicators are homogenously dispersed (or embedded) in a polymer coating on a substrate. Upon the infliction of sufficient damage to a region of the coating, one or more of the capsules rupture in and/or near the damaged region and release the visual indicator(s) contained therein where they chemically react with free and/or residual amines present in the coating (or with a base contained in other ruptured capsules) to locally change color in the damaged area 35 as shown in (a) of FIG. 3. We have shown that microcapsules containing DCF visual indicators dissolved in ethyl phenyl acetate (EPA) can be homogeneously dispersed in an epoxy coating on a substrate. When sufficient damage (e.g., scratch, abrasion or compression) is inflicted to a region of the coating, it induces the microcapsules to rupture and release the DCF solution in and/or near the damaged region, and a dramatic color change from light yellow to bright red is generated in and/or around the damaged region 40 where the DCF species are released and come in contact with the polymer coating as shown in (b) of FIG. 3. This figure shows intact capsules a distance away from the damaged region and ruptured capsules proximate to the damaged region. When the capsule ruptures, the light yellow colored DCF species reacts with free and/or residual amines present in the coating (or with a base contained in other ruptured capsules) to produce a dark red colored product in the damaged region.

A dramatic color change from light yellow to bright red is generated when a DCF species comes in contact with an amine-cured epoxy matrix material. Since DCF provides strong photoluminous signals, only a dilute DCF/EPA solution (e.g., 5 mM) is required. Further, due to a highly localized release mechanism and minimal absorption of capsule core materials into the polymer coating, the delivery of the DCF species is predominantly restricted to the damaged region, which is advantageous over indicators that flow away from the damaged area.

In embodiments, the wt % amount of color indicator microcapsules with respect to the total weight of the film or coating is about 0.5-5%, about 5-10%, about 10-15%, about 15-20%, 20-25%, about 25-30%, about 30-35%, about 35-40%, about 40-45% or about 45-50%. Amounts greater than a wt % of 50% can also be formulated for use in certain applications. For significant visual indication, a wt % of 5% or greater is generally needed for most films or coatings. In a particular embodiment, about 5 wt %, 10 wt % or 15 wt % of microcapsules (with respect to the total weight of the coating) can be added to the epoxy resin film or coating. Since only a little DCF is needed to provide good color indication, the DCF species concentration can be less than about 0.2 wt % or about 0.1 wt % with respect to the total weight of the microcapsule.

In certain embodiments, the polymer composition possessing free and/or residual amines used in the material is based on epoxy resin coatings. The coatings generally have uniform thicknesses, are easy to source and manufacture and allow for wide applications in industry. Similarly, the microcapsules are relatively small in size when compared to the thickness of the coating. The capsules can have different sizes that range from nanometer to millimeter. In some embodiments, the sizes can be as small as hundreds of nanometers, which allows for wider applications.

In some embodiments, the epoxy resin composition comprises bisphenol A epoxy resin, bisphenol F epoxy resin, novolac epoxy resin, aliphatic epoxy resin, cycloaliphatic epoxy resin and/or glycidylamine epoxy resin. In certain particular embodiments, the epoxy resin composition comprises diglycidyl ether of bisphenol A (DGEBA) or diglycidyl ether of bisphenol F (DGEBF). In a certain embodiment, the epoxy resin composition comprises an epoxy resin diluted with a low viscosity reactive diluent. In some embodiments, the low viscosity reactive diluent comprises ethyl hexyl glycidyl ether, trimethylol propane triglycidyl ether, phenyl glycidyl ether or cyclohexane dimethanol diglycidyl ether. In one embodiment, the low viscosity reactive diluent comprises o-cresyl glycidyl ether (o-CGE). In one particular embodiment, the bisphenol-A epoxy resin composition comprises EPON 813™ (HEXION).

EPON 813™ (Hexion)

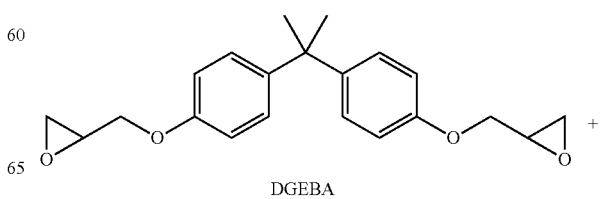

DGEBA

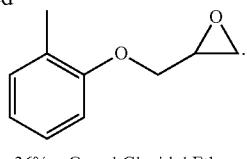

26% o-Cresyl Glycidyl Ether

Homo-Polymerized DGEBA

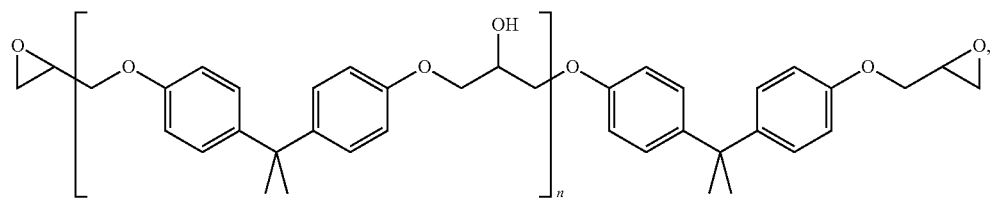

where n denotes the number of polymerized subunits and can number in the tens of thousands or more. In some embodiments, n is in the range from 0 to 25, about 1 to about 25, or about 5-20.

As with other classes of thermoset polymer materials, the epoxy resin compositions can be formulated by blending different grades of epoxy resin, and/or adding additives, plasticizers or fillers to achieve desired processing and/or final properties, or to reduce cost. Curing can be achieved by reacting an epoxy with itself (homo-polymerization) or by forming a co-polymer with polyfunctional curatives or hardeners. In principle, any molecule containing a reactive hydrogen may react with the epoxide groups of the epoxy resin. Common classes of hardeners for epoxy resins include amines, acids, acid anhydrides, phenols, alcohols and thiols. Relative reactivity (lowest first) is approximately in the order: phenol<anhydride<aromatic amine<cycloaliphatic amine<aliphatic amine<thiol. The epoxy curing reaction may be accelerated by addition of small quantities of accelerators. Tertiary amines, carboxylic acids and alcohols (especially phenols) are effective accelerators. Bisphenol A is a highly effective and widely used accelerator.

In some embodiments, the polymeric material comprises an epoxy resin composition and a catalyst, such as a photo-polymerization catalyst. In certain embodiments, the photo-polymerization catalyst comprises a cationic photoinitiator. In some embodiments, the photo-polymerization catalyst comprises IRGACURE® 250 (Iodonium, (4-methylphenyl) [4-(2-methylpropyl) phenyl]-, hexafluorophosphate) (BASF), THP (triarylsulfonium hexafluorophosphate salts) (SIGMA-ALDRICH), THA (triarylsulfonium hexafluoroantimonate salts) (SIGMA-ALDRICH) or DARACUR® 1173 (2-hydroxy-2-methyl-1-phenylpropan-1-one (CIBA).

The damage indication will not occur until an area of the substrate is sufficiently damaged so as to break open the outer shell wall of the microcapsules to locally release the encapsulated indicator agent incorporated therein. The outer shell (e.g., polymer shell-wall) provides protection (e.g., thermal and low impact stability) from unintended rupturing. Accordingly, the outer shell can be a single wall or a multi-walled (e.g., double wall) shell.

The microcapsules can be mixed in an epoxy resin film. In some embodiments, the epoxy resin film comprises zinc-pigmented epoxies, water-based epoxies or DGEBA-based resins. In certain embodiments, the epoxy resin film comprises EPI-REZ™ 6520-WH-53 resin (HEXION) and EPIKURE™ 6870-W-53 (HEXION) curing agent.

The substrate can be anything designed to carry a load, such as a structural or non-structural (e.g., elastomer) substrate. A structural substrate is one that carries the load with minimal deflection. Structural substrates include metal, non-metal, ceramic and polymeric materials. In certain embodiments, the structural substrate comprises a polymeric structural composite (PMC). PMCs are composed of high strength/stiffness fibers, held together by a polymer matrix material. Common components include carbon fiber, glass fiber, and epoxy resin. In one embodiment, the PMC comprises a combination of an epoxy resin with glass or carbon fiber. The epoxy resin can be vacuum infused into the glass or carbon fiber to create a glass or carbon fiber reinforced epoxy composite. In other embodiments, the structural substrate is steel.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise.

The claims may be drafted to exclude any optional element. This statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "at least one" and "one or more" are readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values (e.g., numbers recited in weight percentages and material sizes) proximate to the recited range that are equivalent in terms of the functionality of the individual ingredient, material, composition, or embodiment. The term about can also modify the end-points of a recited range as discussed above in this paragraph.

As will be understood by the skilled artisan, all numbers, including those expressing sizes of materials, quantities of ingredients, and properties, such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited herein are for illustration only and do not exclude other defined values or other values within defined ranges.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "polymer" means a large molecule, or macromolecule, composed of many repeated subunits, from which originates a characteristic of high relative molecular mass and attendant properties. The term "prepolymer" means a precursor containing intermediates or motifs that can undergo further reaction to form a polymer.

The term "capsule" means a closed object having a shell-wall enclosing an interior volume that may contain a solid, liquid, gas or a combination thereof, and having an aspect ratio of about 1:1 to about 1:10. The aspect ratio of an object is the ratio of the shortest axis to the longest axis, where the axes need not be perpendicular. A capsule may have any shape that falls within this aspect ratio, such as a sphere, a toroid or an irregular amoeboid shape. The surface of a capsule may have any texture, for example, rough or smooth.

Capsules may be made by a variety of techniques and from a variety of materials. Examples of materials from which the capsule shell materials may be made, and the techniques for making capsules include: poly(urea-formaldehyde), polyurethane, and polyurea formed by interfacial polymerization; polystyrene, polydimethylsiloxane, and poly(phthalaldehyde) formed by solvent evaporation; and all of these capsules prepared by a microfluidic approach.

The phrase "autonomic self-indicating material" refers to automatically (without human or electronic control intervention) stopping, starting and adapting operation of the self-indicating material depending on environmental or physical stimuli. The objective of the self-indicating material is to indicate the environmentally or physically damaged region of the material without any human or machine involvement. For example, when environmental or physical stimuli damage the material so as to rupture the described microcapsules contained therein, the capsule core composition(s) releases in and/or around the area that is damaged, and autonomic indication of the damaged region can be achieved. Similarly, the material can also be designed to autonomically heal the damaged region and autonomically indicate that the damaged region has been healed.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

A "sufficient" amount refers to an amount sufficient to bring about a recited effect, such as an amount of damage inflicted to a coating that is necessary to rupture one or more microcapsules, thereby releasing the agents contained therein. Thus, a "sufficient" amount generally means an amount that provides the desired effect.

The design and operation of an autonomic self-indicating system was demonstrated in the following Examples. The system was capable of self-indicating damage when a sufficient amount of damage was inflicted to it so as to break open microcapsules embedded therein. The following Examples are intended to illustrate the above invention and should not be construed as to narrow its scope. One skilled in the art will readily recognize that the Examples suggest many other ways in which the invention could be practiced. It should be understood that numerous variations and modifications can be made while remaining within the scope of the invention.

EXAMPLES

Example 1—Materials and General Procedures (i) Materials

2',7'-Dichlorofluorescein (DCF, Sigma-Aldrich, St. Louis, Mo.) was used as a visual indicator for mechanical damage. Ethylene maleic anhydride copolymer (EMA, Zemac-400, average molecular weight=400,000) from Vertellus (Indianapolis, Ind.), urea, ammonium chloride, resorcinol, 1-octanol, formaldehyde solution (37 wt % in $H_2O$), ethyl phenyl acetate (EPA), sodium hydroxide (NaOH) from Sigma-Aldrich, and commercial polyurethane (PU) prepolymer (Desmodur L 75) from Bayer MaterialScience were used for synthesis of microcapsules. EPON™ resin 813 (74% diglycidyl ether of bisphenol-A and 26% o-cresyl glycidyl ether) and curing agent EPIKURE™ 3233 (polyoxypropylene triamine) (Miller-Stephenson, Hoston, Tex.) were selected as matrix materials. Ninhydrin (2,2-Dihydroxyindane-1,3-dione) obtained from Sigma-Aldrich was used to detect the residual amine content in matrix materials.

(ii) Synthesis of Indicating Microcapsules

The microcapsules were prepared by adapting conventional procedures. For example, see the procedures described in Caruso, M. M.; Blaiszik, B. J.; Jin, H. H.; Schelkopf, S. R.; Stradley, D. S.; Sottos, N. R.; White, S. R.; and Moore, J. S., *Robust, Double-Walled Microcapsules for Self-Healing Polymeric Materials*, ACS Appl. Mater. Interfaces, Vol. 2 (4), pp 1195-1199 (2010), which is incorporated herein in its entirety. In one embodiment, polyurethane/poly-(urea-formaldehyde) (PU/UF) double-shell-wall microcapsules containing DCF were synthesized using a single batch process. The capsules were prepared in a mixer via in situ interfacial polymerization of urea and formaldehyde (UF) in an oil-in-water emulsion. In brief, about 25 mL of about 2.5 wt % EMA aqueous solution was mixed with additions of about 100 mL $H_2O$, about 2.5 g urea, about 0.25 g ammonium chloride, about 0.25 g resorcinol, and about 2 droplets of 1-octanol. The pH of the mixture was adjusted to about 3.5 using about 20 wt % NaOH solution. Stable microcapsules containing about a 5 mM DCF/EPA solution as the core material (referred to as DCF microcapsules) were fabricated. Under mechanical agitation at about 800 rpm, the core solution consisting of about 0.12 g DCF, about 60 mL EPA, and about 2 g PU was slowly added into the mixture and allowed to emulsify for about 10 min. Afterward, about 6.33 g formaldehyde solution was introduced into the emulsion and the encapsulation was carried out in a water bath at about 55° C. for about 4 h with a heating rate of about 1° C./min. The synthesized microcapsules were filtered, gently rinsed with deionized water to remove the excessive surfactant, and sieved to reduce the size distribution. Polydispersed microcapsules were produced with diameters ranging between about 20-75 μm and average diameter of about 48 μm. Microcapsules containing an amine (EPIKURE™ 3233) were prepared according to a conventional vacuum infiltration method.

(iii) Fabrication of Coatings

Epoxy EPON™ 813 and curing agent EPIKURE™ 3233 were mixed by stoichiometry (e.g., weight ratio of about 100:43). Microcapsules were added into the mixture at various weight percentages. The well-mixed suspension was coated on glass slides or steel substrates using a micrometer controlled doctor blade and cured at about 35° C. for about 48 h. Additional thermal treatments of about 6 h at about 50° C., about 2 h at about 80° C., and up to about 10 h at about 100° C. were applied to specific samples. The final thickness of the coating was controlled to be about 350 μm±50 μm.

(iv) Capsule and Coating Characterization

Microcapsules and coatings were examined using optical microscopy (Leica DMR), scanning electron microscopy (SEM, Philips XL30 ESEM-FEG), and stereomicroscopy (Zeiss SteREO Discovery V20 Microscope). Coatings were also imaged with a Canon EOS 7D camera. Epoxy swelling was evaluated by immersing samples in EPA and recording weight change after about 1 h of soaking time. About 0.02 g ninhydrin (2,2-dihydroxyindane-1,3-dione) dissolved in about 10 mL ethanol solution was used to detect the free and/or residual amines in epoxies. Specifically, epoxy samples were soaked in the ninhydrin-ethanol solution for about 1 h, and then held at about 100° C. for about 15 min. Free and/or residual amine groups were then indicated by a produced (Ruhemann's) purple color. For comparison, parallel tests were conducted in about 5 mM DCF/EPA solution to demonstrate the ability of DCF to react with the free or residual amine groups in the epoxy samples. Molecular structures were determined by nuclear magnetic resonance (NMR) spectra (Varian Unity 400 NB, Varian VXR 500, and Varian Unity 500 NB spectrometer). Visible spectra of DCF/EPA solution and soaked epoxy samples were obtained by UV-Vis-NIR spectrophotometry (Varian/Cary 5 G). Thermal behavior of DCF microcapsules and epoxy coatings were characterized by Thermogravimetric Analysis (TA Instrument Q50) and Differential Scanning calorimetry (TA Instrument Q20). The heating rate was kept at about 10° C./min and the purge gas was nitrogen.

Example 2—Characterization of DCF Color Change

Figure 4:
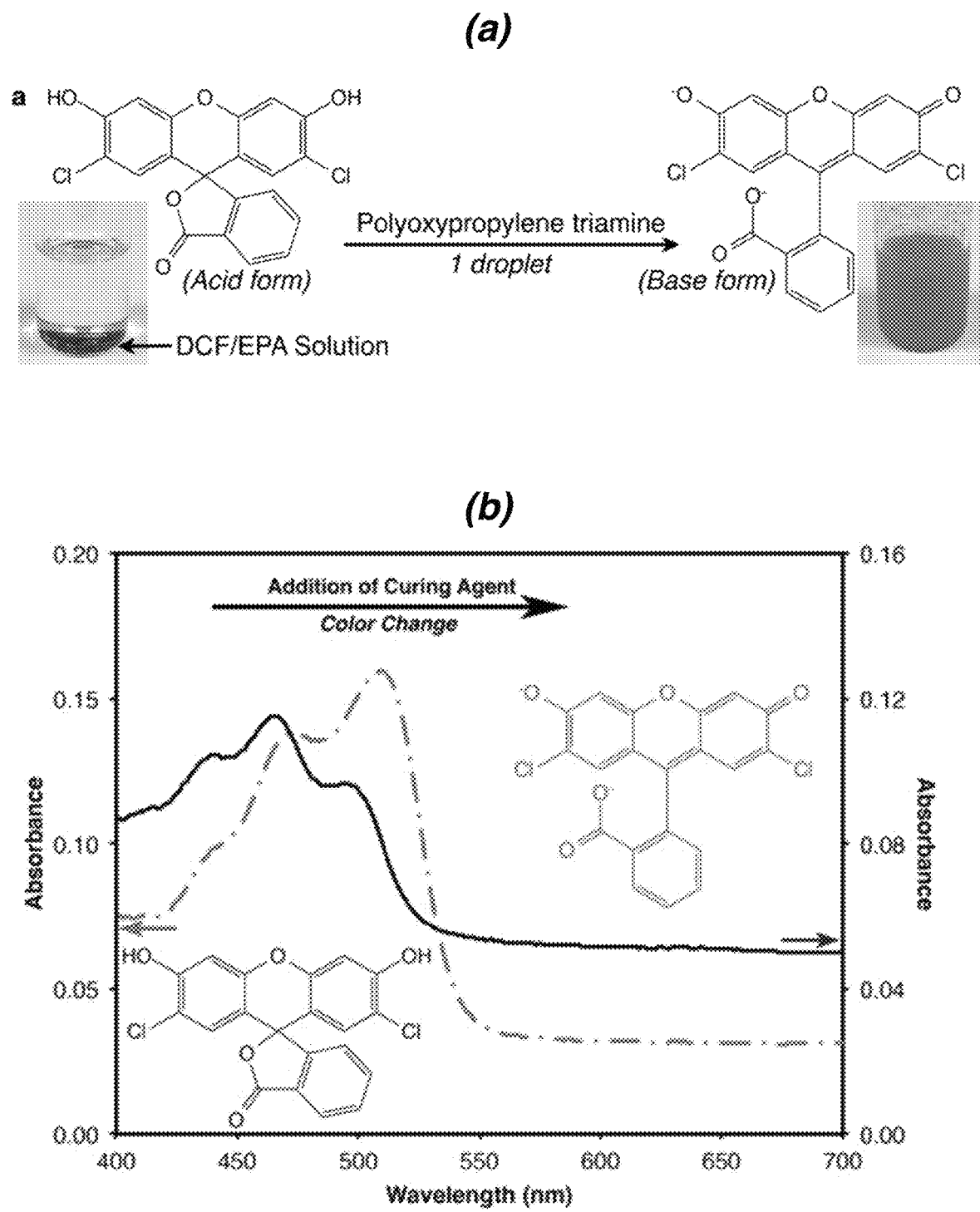
FIG. 4 shows the chemical reaction and visible spectra of DCF and polyoxypropylene triamine.

DCF is a good indicating agent due to its high reactivity with a variety of amines to produce a vibrant color change. DCF is soluble in EPA, a non-toxic solvent that has previously been encapsulated. The DCF/EPA solution is initially light yellow in color, but changes into an opaque red suspension almost immediately after coming into contact with a base, such as an amine. For instance, adding one drop of polyoxypropylene triamine (EPIKURE™ 3233, Hexion) to a DCF/EPA solution changed the solution from light yellow (acid form of DCF) to deep red (base form of DCF). This reaction and images of the DCF/EPA solutions before and after being exposed to an amine are shown in (a) of FIG. 4, while (b) of the figure shows the visible spectra of the DCF/EPA solution before and after addition of the EPIKURE™ 3233 curing agent. The molecular structures of DCF before and after the reaction are shown in (a) of FIG. 4 and were determined by nuclear magnetic resonance (NMR) analysis.

2',7'-dichlorofluorescein 1H NMR (400 MHz, DMSO): δ=6.66 (s, 2H), 6.91 (s, 2H), 7.34 (d, 1H), 7.75 (t, 1H), 7.83 (t, 1H), 8.02 (d, 1H), 11.11 (s, 2H). 13C NMR (500 MHz, DMSO): δ=82.19, 104.38, 111.12, 116.92, 124.62, 125.74, 126.58, 128.88, 131.16, 136.54, 150.76, 152.18, 155.80, 168.95.

2-(2,7-dichloro-6-oxido-3-oxo-3H-xanthen-9-yl)benzoate 1H NMR (400 MHz, DMSO): δ=6.16 (s, 2H), 6.74 (s, 2H), 7.12 (d, 1H), 7.50 (m, 2H), 8.01 (d, 1H). 13C NMR (500 MHz, DMSO): δ=103.69, 109.72, 127.46, 128.26, 129.28, 129.51, 129.74, 130.62, 133.70, 140.60, 157.03, 169.97, 173.64.

The addition of the amine caused DCF molecules to evolve into a basic form and precipitate out of the EPA solution due to a dramatic drop in solubility.

Example 3—Cured Epoxy Specimens

Figure 5:
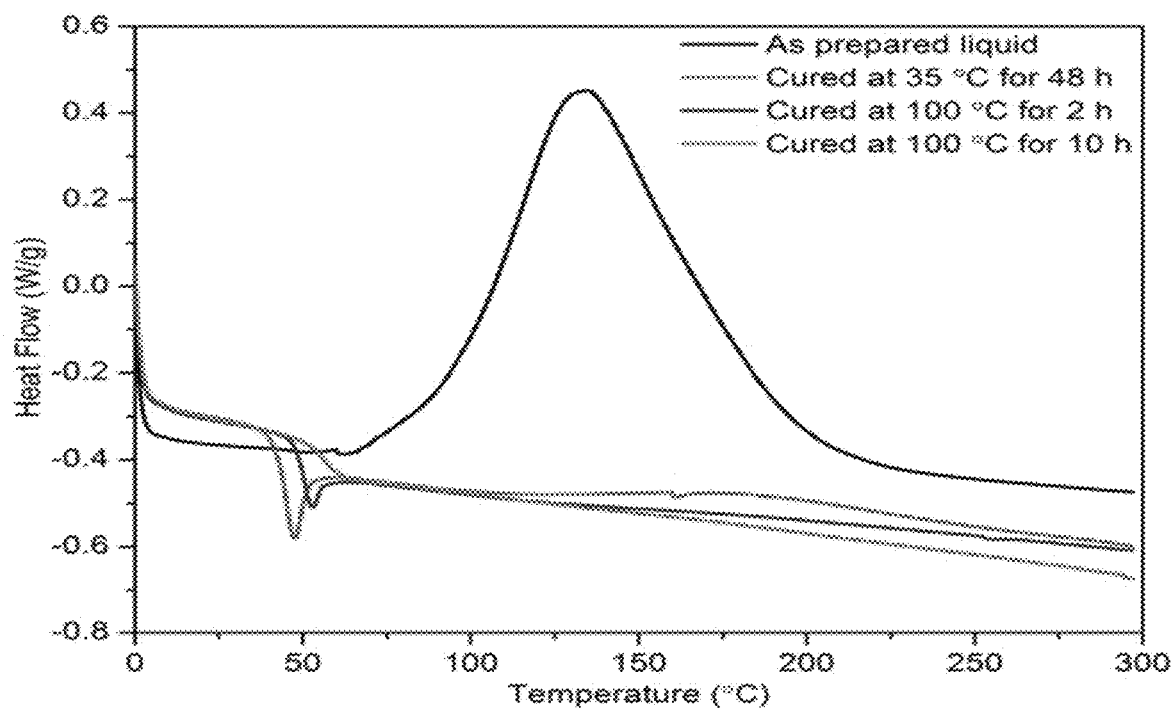
FIG. 5 shows a differential scanning calorimetry graph of the reaction of an epoxy resin and an amine-curing agent subjected to different cure cycles.

Epoxy specimens were prepared with a stoichiometric ratio of EPON™ Resin 813 (bisphenol-A based epoxy resin diluted with cresyl, Hexion) and amine-curing agent EPI-KURE™ 3233 (100:43) and the specimens were subjected to various cure cycles. FIG. 5 shows differential scanning calorimetry of stoichiometric EPON 813 and EPIKURE 3233 with different cure cycles. The degree of cure was about 96% after about 48 h at about 35° C. and about 100% after about an additional approximately 2 h at about 100° C. Note that the thermal conditions indicated in the graph refer to the last isothermal process, e.g., those cured at about 100° C. experienced about 48 h at about 35° C., about 6 h at about 50° C., and about 2 h at about 80° C., prior to the last thermal process.

Example 4—Characterization of Cured Epoxy Specimens

Figure 6:
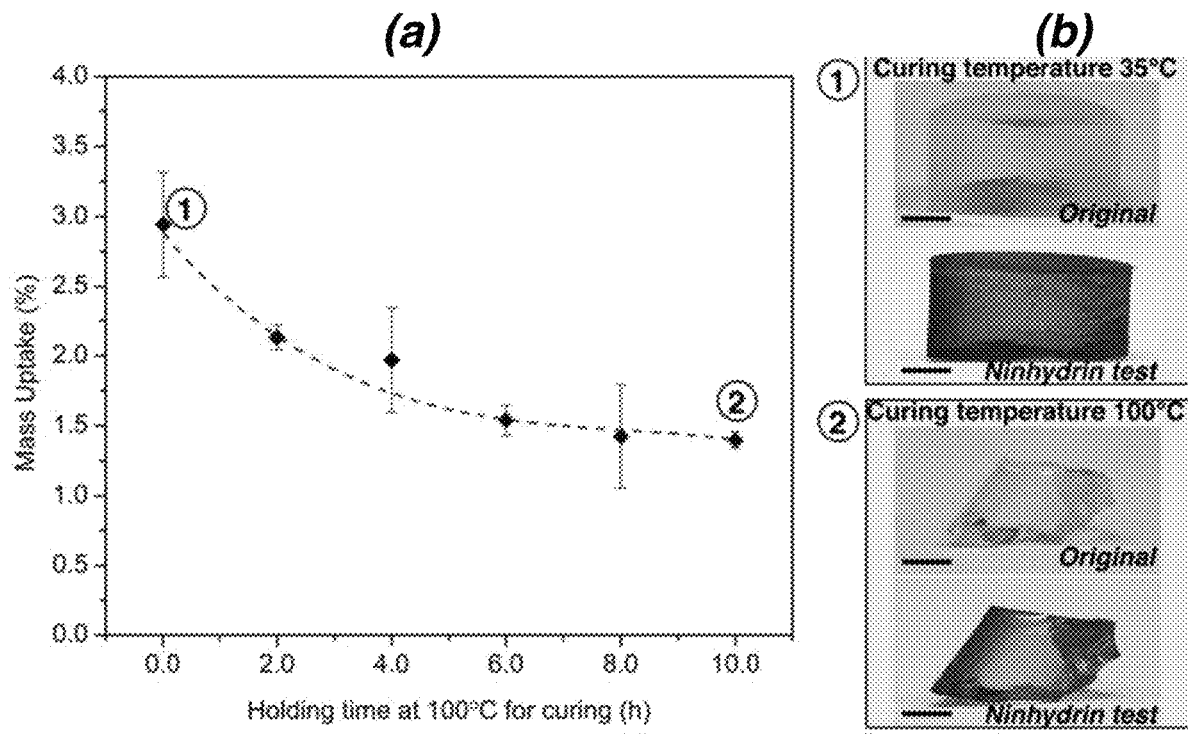
FIG. 6 shows a mass uptake curve for epoxy specimens soaked in ethyl phenyl acetate (EPA) and subjected to different cure cycles, and images of a ninhydrin test applied to epoxy specimens subjected to different cure cycles.

Cured epoxy specimens were soaked in EPA solvent and weighed. A curve of the mass uptake of the epoxy specimens (due to EPA swelling) subjected to different cure cycles is shown in (a) of FIG. 6. The isotherm period for cure (1) was about 35° C. for about 48 h, and for cure (2) was about 48 h at about 35° C., about 6 h at about 50° C., about 2 h at about 80° C., and 2-10 h at about 100° C. The mass uptake of EPA by the epoxy specimen after about 1 h soaking was about 2.9% for specimens cured at about 35° C., and about 1.4% for specimens cured at about 48 h at about 35° C., about 6 h at about 50° C., about 2 h at about 80° C., and about 100° C. for 10 h. The absorption of EPA into epoxy aids the transport of DCF species into the matrix and the formation of red precipitates in the epoxy.

We have shown the presence of unreacted (free and/or residual) amines after the reaction of EPON™ 813 and EPIKURE™ 3233. The free and/or residual amines in a cured epoxy coating were detected by a ninhydrin (2,2-dihydroxyindane-1,3-dione) reaction. Amine-cured epoxy specimens were prepared as described above and imaged after being soaked in a ninhydrin-ethanol solution for about 1 h and then heated at about 100° C. for about 15 min. A strong purple color was observed in both samples cured at about 35° C. and about 100° C., as shown in the accompanying photos in (b) of FIG. 6. This Ruhemann's purple color was produced in both tests, which indicates the existence of unreacted amines in the epoxy matrices. Accordingly, even though the epoxies were essentially fully cured, (free and/or residual), unreacted amine groups were still present in the matrix.

Example 5—DCF Reaction with Unreacted Amines in a Cured Epoxy Specimen

To examine the ability of DCF to react with free and/or residual amines, cured epoxy samples were soaked in a core solution (e.g., 5 mM DCF/EPA solution). In (a) and (b) of FIG. 7, the color changes are shown for epoxy specimens soaked in a DCF/EPA solution and cured under different conditions. DCF precipitates were continuously generated and the entire epoxy specimen turned red when lifted from the solution after about 1 h as shown in the images in (a) of FIG. 7. Fracture surfaces of the epoxy specimens were examined to exclude any possible surface effect, and the reacted red color species were found not only on the surface of the epoxy pieces, but also within the interior of the samples. The curing conditions were (i) about 48 h at about 35° C. for the 35° C. cured epoxy, and (ii) about 48 h at about 35° C., about 6 h at about 50° C., about 2 h at about 80° C., and finally about 2 h at about 100° C., for the 100° C. cured epoxy. The scale bar is about 2 mm. Visible spectra of the epoxy samples are displayed in (b) of FIG. 7.

Figure 7:
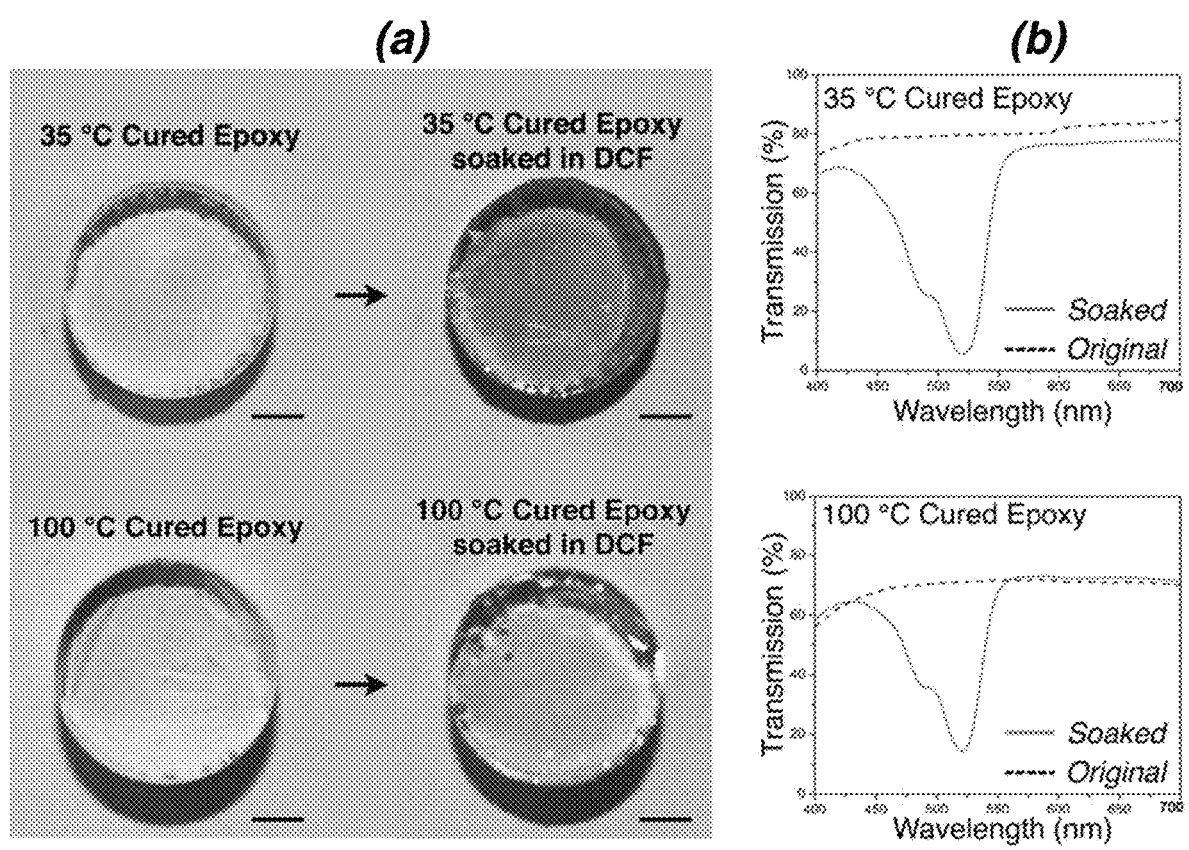
FIG. 7 shows images and visible spectra of the color changes for epoxy specimens cured under different conditions and soaked in a DCF/EPA solution.
Figure 7:
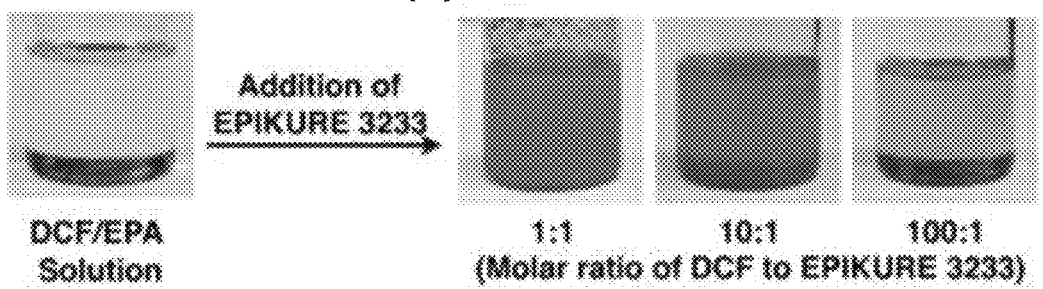
Figure 7:
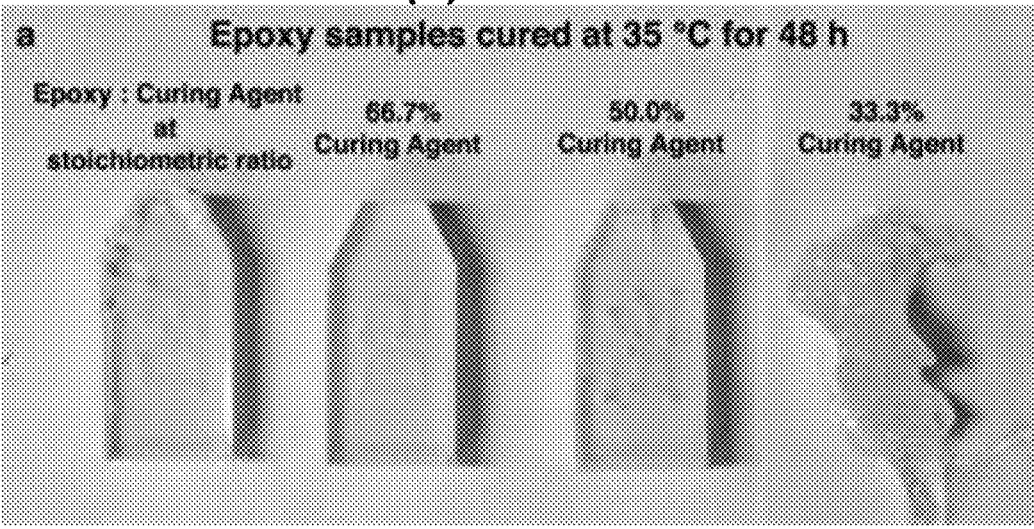
Figure 7:
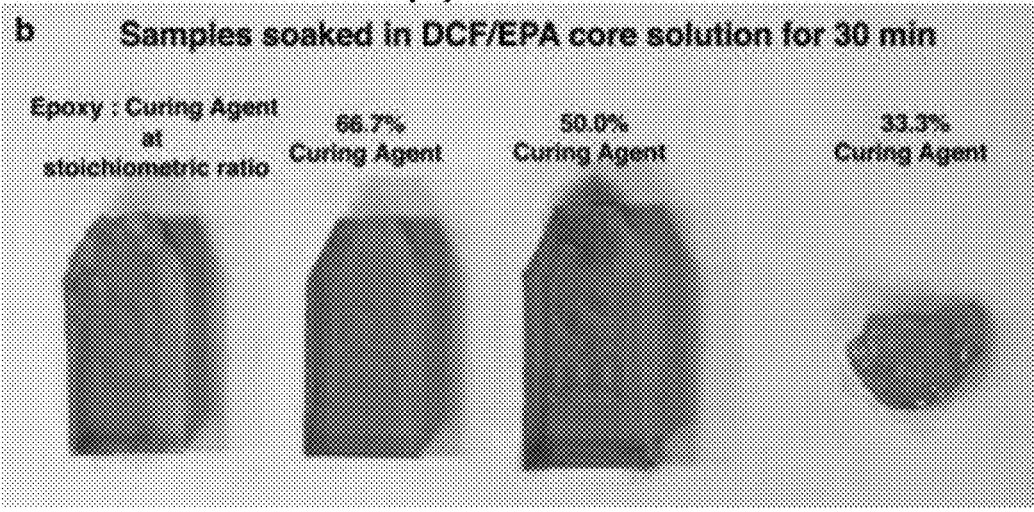

In (c) of FIG. 7, the DCF/EPA core solution color changes triggered by the addition of liquid EPIKURE 3233 curing agent are shown. The color reaction occurs at a concentration of curing agent as low as 100:1 molar ratio of DCF to EPIKURE 3233. For an epoxy specimen prepared with a stoichiometric ratio of EPON813-EPIKURE3233 (100:43), the color change of a 5 mM DCF/EPA solution can be triggered when an estimated 0.0067% amine remained after the curing cycle.

The color changes triggered by residual amines in the epoxy matrix are shown in (d) and (e) of FIG. 7. In (d) of the figure, as-prepared epoxy specimens cured by various amounts of curing agent (EPIKURE 3233) are shown. From the left to the right, the curing agent concentration continuously decreased from the stoichiometric value to one-third of that value. At very low curing agent concentrations, the epoxy cannot fully cross-link to form a solid sample. In (e) of the figure, epoxy specimens imaged after being soaked in the DCF/EPA solution for about 30 minutes are shown. All of the specimens became red in color, indicating sufficient residual amines for reaction regardless of the initial curing agent concentration.

Figure 8:
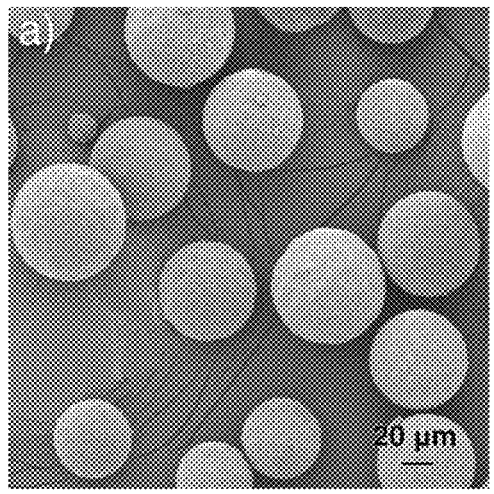
FIG. 8 shows images of DCF microcapsules before and after being ruptured, and DCF microcapsules immersed in an amine-based curing agent before and after being ruptured.
Figure 8:
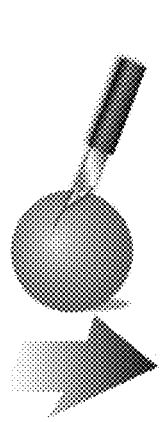
Figure 8:
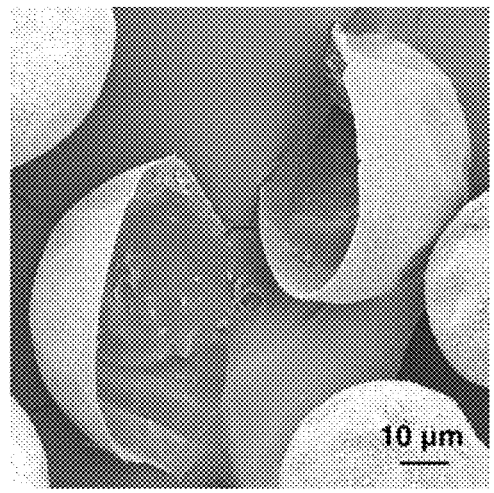
Figure 8:
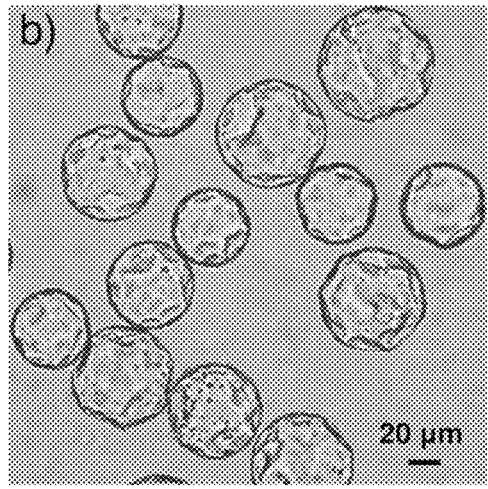
Figure 8:
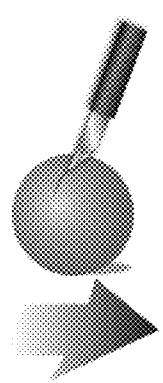
Figure 8:
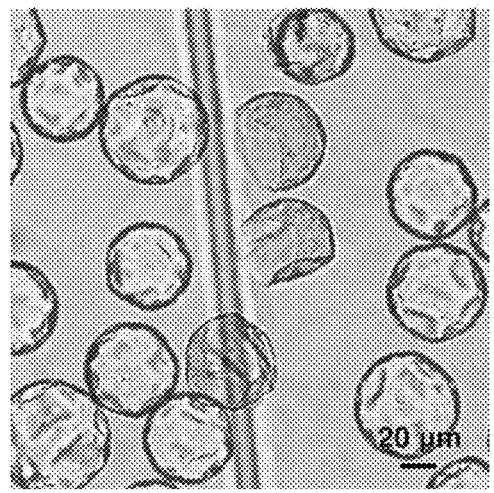

Example 6—DCF Color Change of Ruptured Microcapsules in the Presence of an Amine FIG. 8 shows DCF filled microcapsules before and after being ruptured. Representative SEM images of dry capsules before and after rupture (by a razor blade) are shown in (a) of FIG. 8. The microcapsules are 48±13 μm in diameter and the shell wall was well-formed with a characteristic rough surface and thickness of approximately 300 nm. Capsules were also immersed in an amine-curing agent (e.g., polyoxypropylene triamine) and some of these capsules were ruptured in a similar fashion as above, which is shown by the optical images in (b) of FIG. 8. The damaged microcapsules soaked in an amine-based curing agent immediately changed color, while intact microcapsules soaked in the same amine-based curing agent remained unchanged. The color developed when the core materials encapsulated in the microcapsules were released by rupture of the capsule shell wall.

Example 7—DCF Microcapsule Stability Studies

Figure 9:
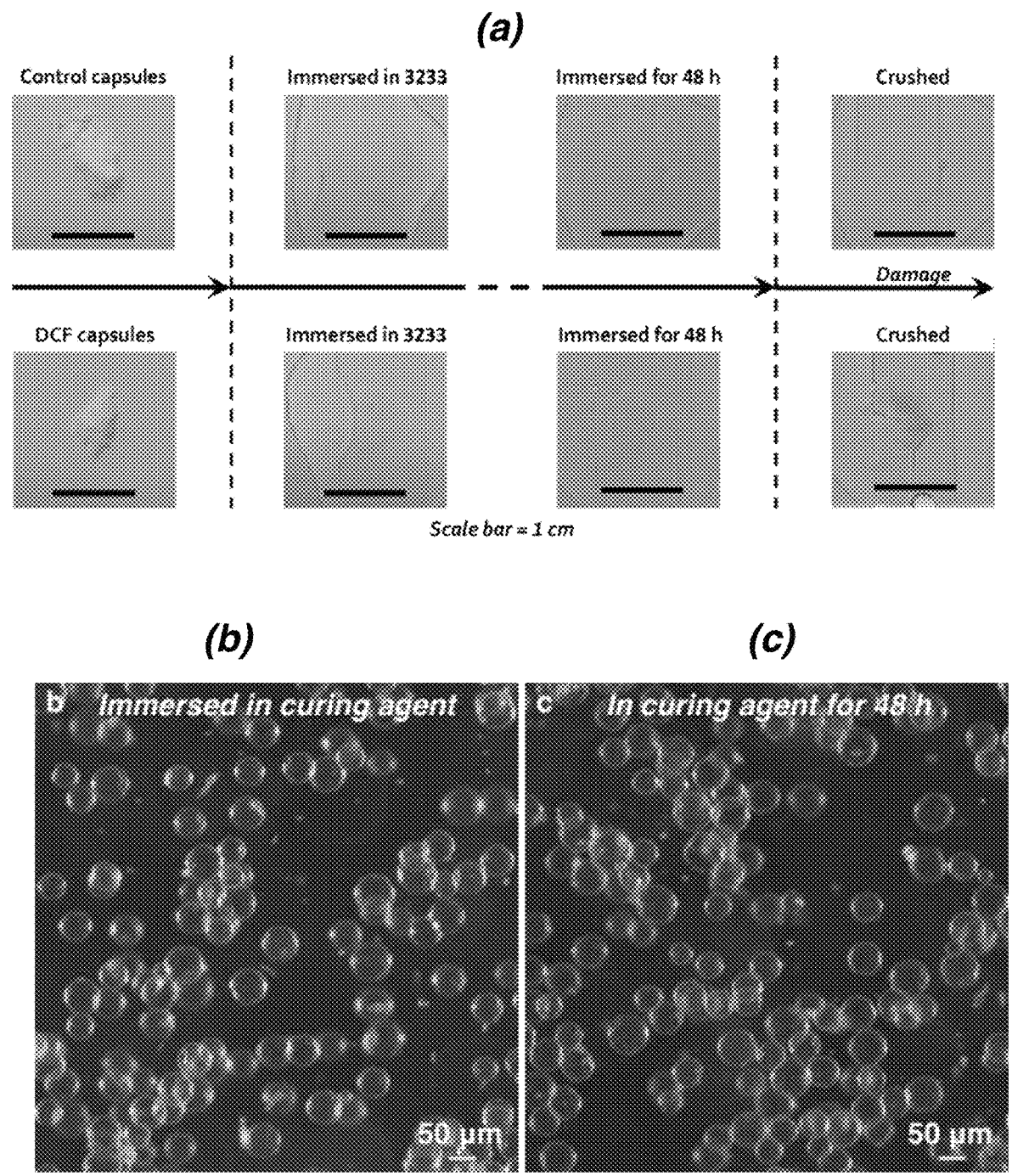
FIG. 9 contains images showing the stability of DCF microcapsules in the presence of an amine-curing agent.

The thermal stability of DCF microcapsules in the presence of an amine-curing agent was examined by immersing the DCF microcapsules in EPIKURE' 3233 for about 48 h. The results are shown in the images of FIG. 9. In (a) of FIG. 9, the microcapsules survived in the curing agent long enough for the epoxy resin to fully cure, and remained active to turn on the indication when crushed to release DCF into the curing agent. The control capsules used EPA as the core material. In (b) and (c) of FIG. 9, stereomicroscopic images of DCF microcapsules immersed in a curing agent for (b) 1 min and (c) 48 h are shown. No color changes were observed and all of the capsules remained intact.

Figure 10:
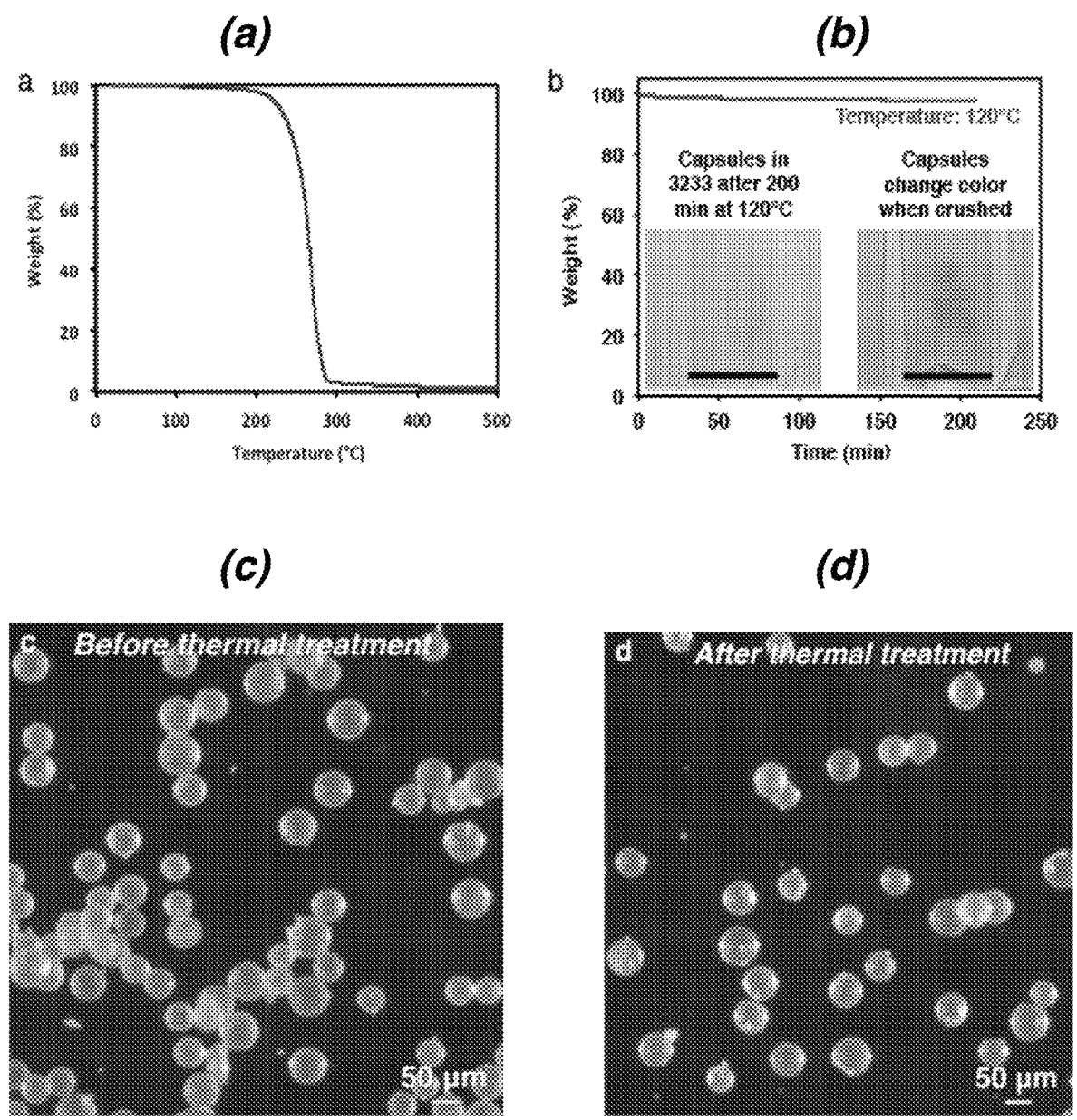
FIG. 10 shows dynamic and isothermal gravimetric analyses (TGA) of DCF microcapsules, and images displaying that the DCF microcapsules remained intact and active after the isothermal treatment.

The thermal stability of DCF microcapsules was also evaluated by dynamic and isothermal gravimetric analyses (TGA) at about 120° C. for about 200 min. The results are shown in FIG. 10. In (a) of FIG. 10, the dynamic TGA curve of DCF microcapsules at a heating rate of about 10° C./min is shown, while (b) of the figure shows images revealing the isothermal TGA of microcapsules at about 120° C. for about 200 min. Inserts (photos) were taken of the microcapsules immersed in curing agent after the thermal treatment. The microcapsules exhibited excellent thermal stability, remained intact and active after isothermal treatment, and exhibited color change when crushed (right). The scale bars in the inserts are each about 1 cm. Stereomicroscopy images of DCF microcapsules (c) before and (d) after thermal treatment at about 120° C. for about 200 min are shown in FIG. 10. No color changes were observed and all of the capsules remained intact. In all the tests, the DCF microcapsules remained intact and no color changes or significant weight loss were observed. After each of these stability tests, the microcapsules were crushed within amine and found to remain active indicators.

Example 8—Characterization of DCF Color Change in Scratched Epoxy Specimens

Figure 11:
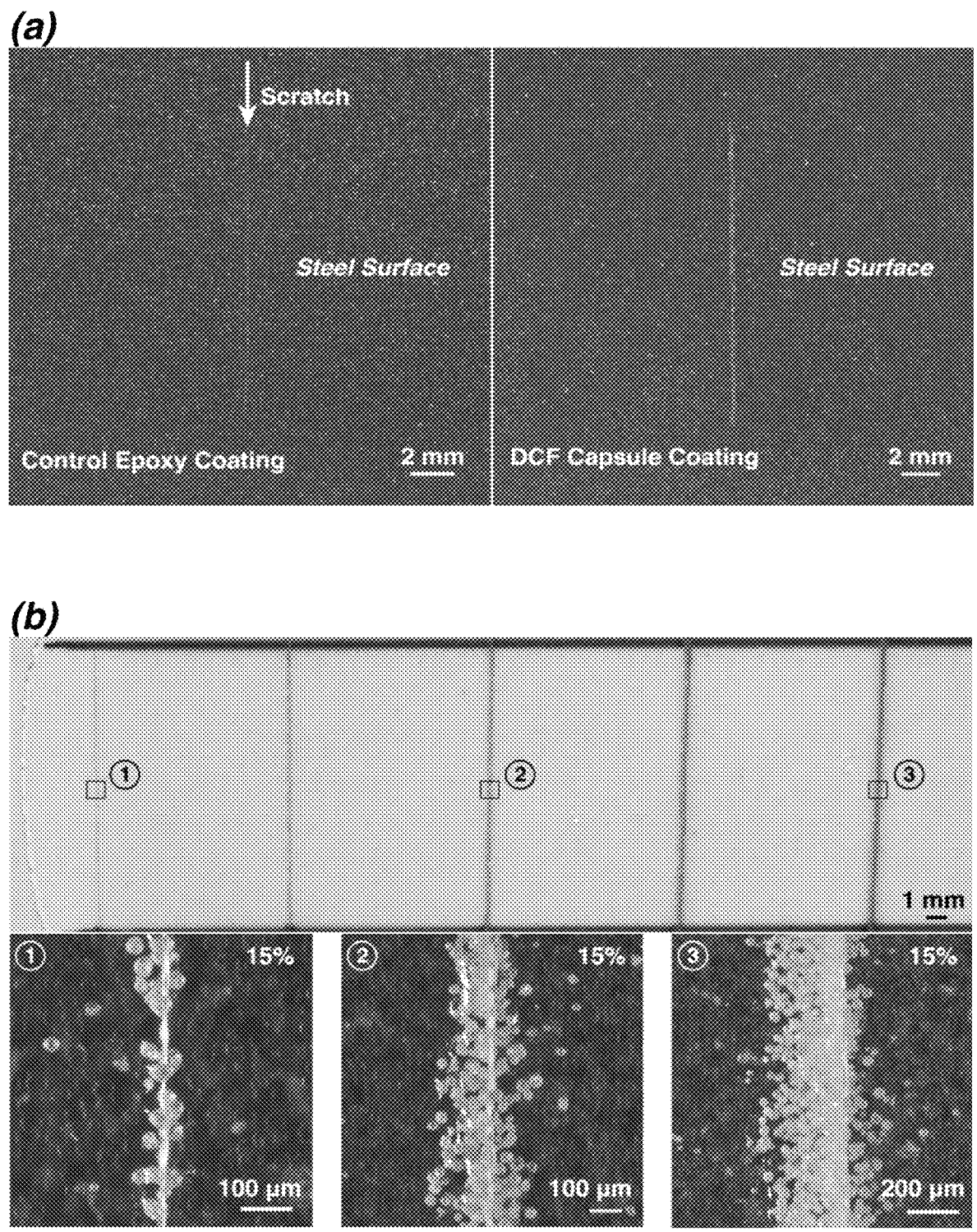
FIG. 11 shows DCF microcapsule autonomous damage indication in scratched epoxy coatings.

FIG. 11 shows autonomous damage indication in scratched epoxy coatings that are embedded with DCF microcapsules. DCF capsules were mixed with epoxy and coated (about 350 μm thick) onto a steel substrate. Coatings were scribed with a stylus and imaged by digital camera (Canon EOS 7D) and stereomicroscope (Zeiss SteREO Discovery V20 Microscope). The scribed region immediately changed color and the intensity grew stronger and stabilized within a period of about 30 min. Optical images of a control epoxy coating having no capsules (left) and an epoxy coating having about 10 wt % of DCF microcapsules (right) on steel substrates, with each coating having an identical scratch, are shown in (a) of FIG. 11. The scratch in the self-reporting coating was highly visible in comparison to a significantly less visible identical scratch in the control epoxy coating that did not contain DCF microcapsules. In order to better evaluate the performance of DCF epoxy coatings and maximize color intensity, we carried out experiments on transparent glass substrates. Shown in (b) of FIG. 11, are a series of scratches with increasing depth created in an epoxy coating specimen having about 15 wt % of DCF microcapsules. Looking from left to right in the figure, scratch depth is about 75 μm, about 110 μm, about 150 μm, about 240 μm, and about 370 μm. As the cutting depth was increased, considerably more capsules were damaged and the color intensity was significantly enhanced.

Figure 12:
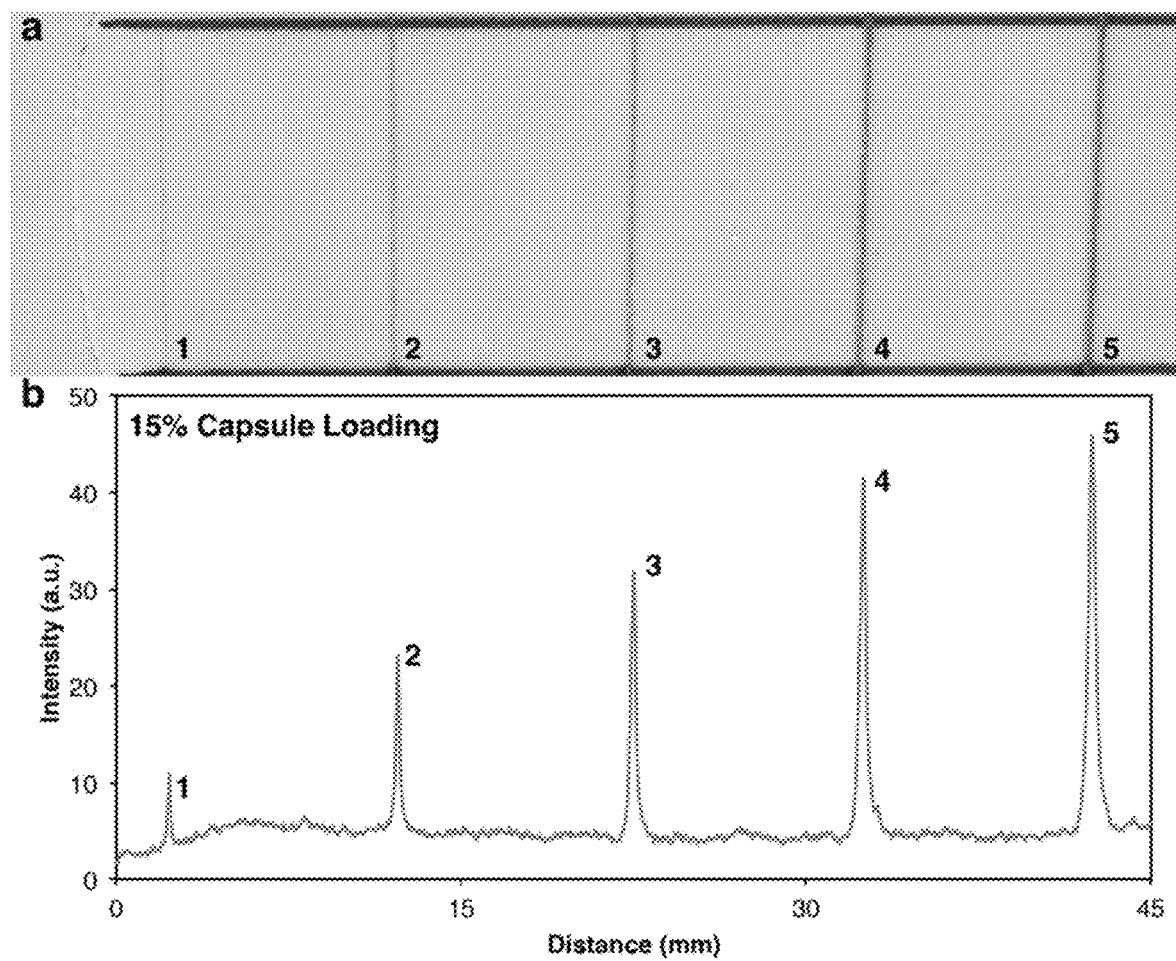
FIG. 12 shows photo and color intensities of scratches at varying depth in an epoxy coating having about a 15 wt % DCF microcapsule concentration.

The width of the scratches increased with cutting depth, which led to rupture of a greater number of microcapsules. In this experiment, scratches as small as about 10 μm in width in the coating were clearly indicated. Further improvement in indication resolution can be achieved by utilizing smaller microcapsules, though at some point in reducing size, the microcapsules would require magnified optical observations when the current self-reporting ability reaches the limit of non-equipment-aided visual detection. The photo and color intensities of scratches at varying depth in an epoxy coating with about 15 wt % DCF microcapsule concentration are shown in FIG. 12. As can be readily seen in the figure, the depths of the scratches continuously increase from the left side to the right side.

Figure 13:
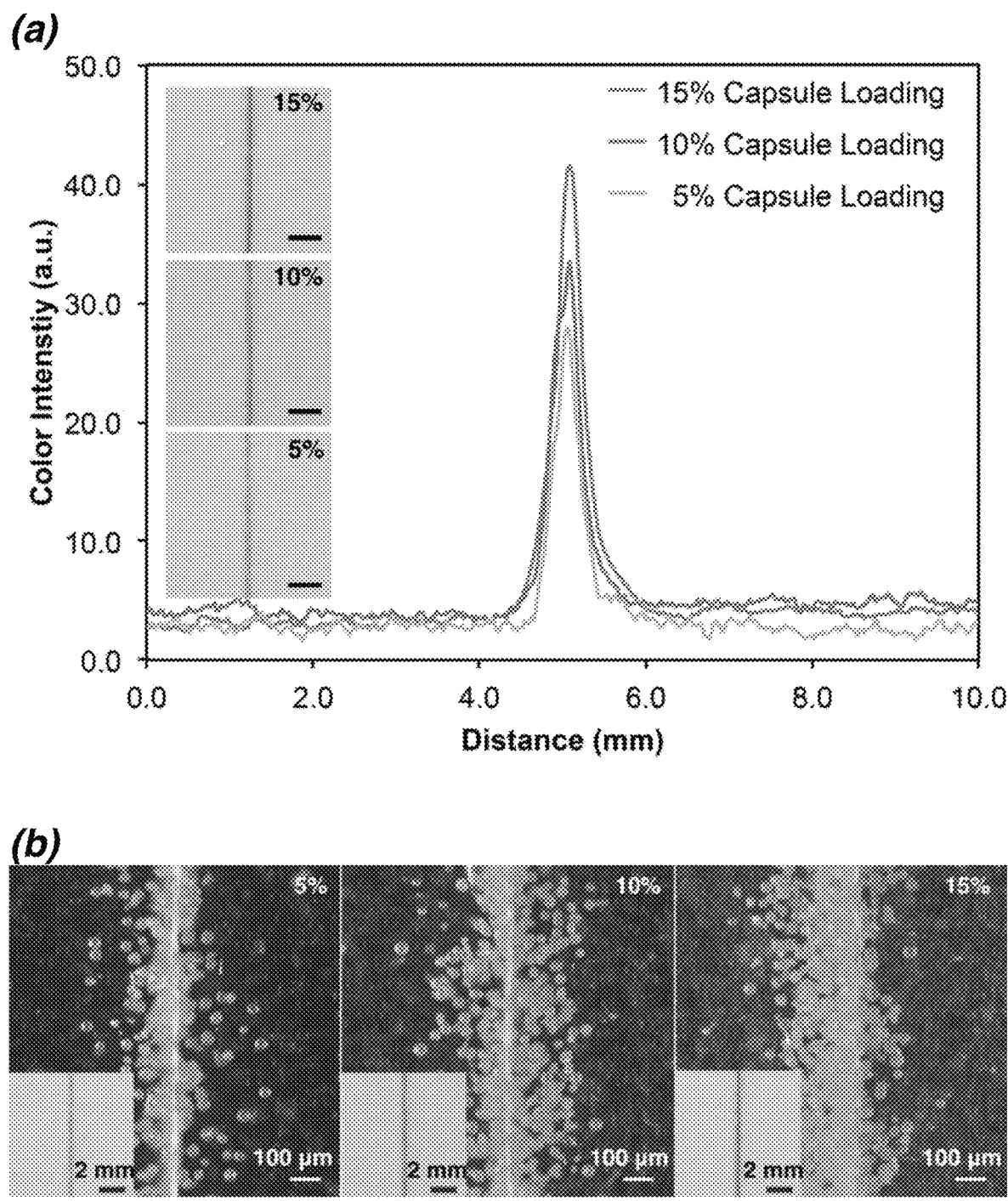
FIG. 13 shows color intensities and optical images of identical scratches at varying loadings of DCF microcapsules in an epoxy coating.

Color intensity is also dependent on the concentration of DCF microcapsules in the coating as shown in (a) of FIG. 13. Identical scratches were inflicted on epoxy coatings having different DCF microcapsule concentrations. Color intensity increased with increasing microcapsule concentration due to a higher number density per unit area of ruptured microcapsules for identical sized scratches, as can be readily seen in the optical images shown in (b) of FIG. 13. The scale bar in the figure is about 2 mm. In one embodiment, a minimum microcapsule concentration of about 5 wt % provided sufficient color intensity for significant visual indication.

Figure 14:
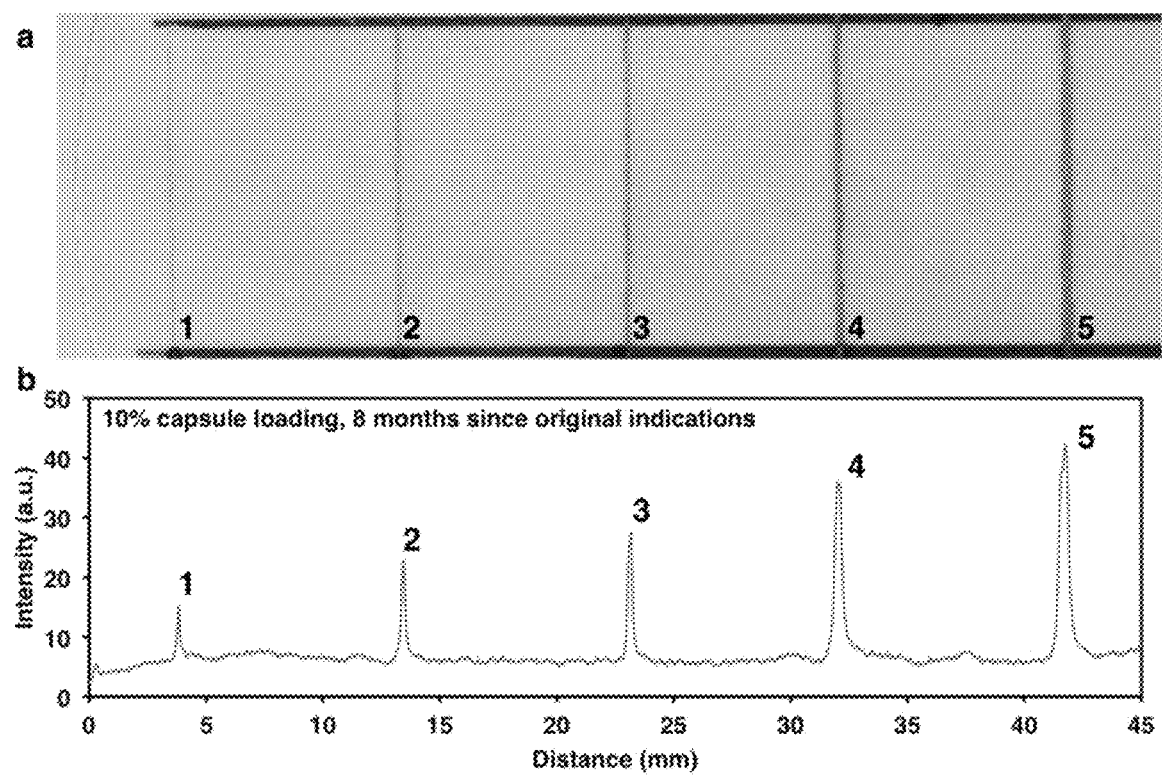
FIG. 14 shows photos and color intensity profile of an epoxy coating having about 10 wt % DCF microcapsule concentration after the coating was scratched and stored for a period of time.

FIG. 14 shows photo and color intensities of scratches in an epoxy coating with about 10 wt % DCF microcapsule concentration after the coating was scratched, imaged and stored for over about 8 months at room temperature before being scratched and imaged again. As can be readily seen in the figure, the depths of the scratches continuously increase from the left side to the right side. Little to no change in color intensity was observed in either the damaged or intact region. New scratches were then made to undamaged locations, and the autonomous indication was essentially equivalent in intensity to the experiments carried out about 8 months previously.

Figure 15:
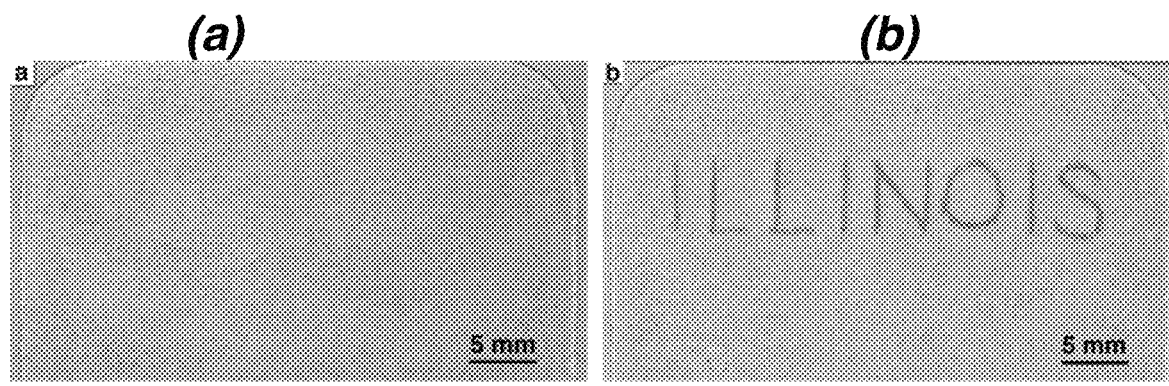
FIG. 15 shows images of DCF microcapsules embedded in amine-cured epoxy coatings that were cured at higher temperatures and subjected to damage.

We also examined coatings that were cured at higher temperature (about 10 h at about 100° C.) and found little to no evidence of thermal degradation of indication performance. The results are shown in FIG. 15, where (a) shows an epoxy coating with about 10 wt % DCF microcapsules cured at about 35° C. for about 48 h, about 50° C. for about 6 h, about 80° C. for about 2 h, and about 100° C. for about 10 h, and (b) shows the autonomous damage indication in the same coating (scratched lettering of "ILLINOIS" created by razor blade).

Example 9—Control Coatings with Different Capsules and Coating Materials

Figure 16:
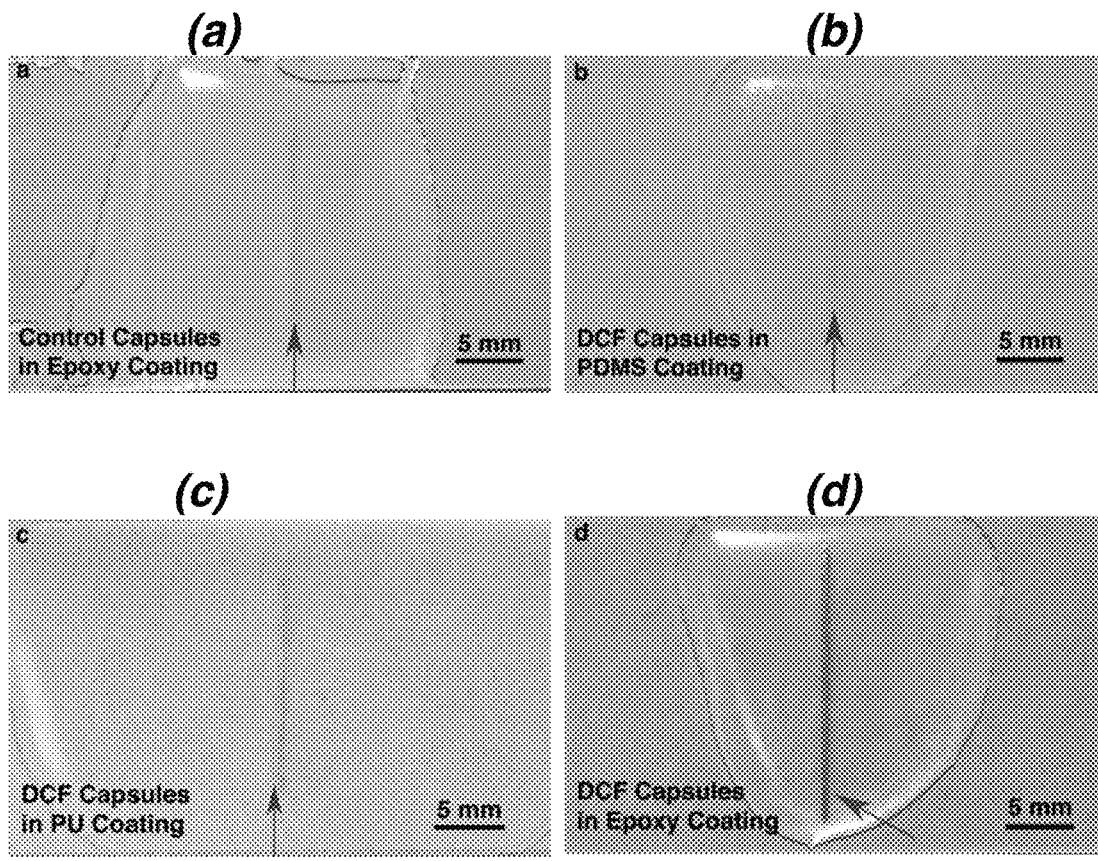
FIG. 16 shows images of DCF microcapsules embedded in an amine-cured epoxy coating compared to three control experiments in a variety of microcapsule-embedded coatings.

Control experiments in a variety of microcapsule-embedded coatings confirmed the proposed indicating mechanism. The experiments were performed in coatings with (1) non-indicating microcapsules (EPA core) in amine-cured epoxy specimens and (2) DCF microcapsules in amine-free polymers (e.g., polydimethylsiloxane (PDMS), polyurethane (PU)). Optical images of the results are shown in FIG. 16 for three control coatings (a, b, and c), and one targeted embodiment (d), where, (a) is an epoxy coating with non-indicating microcapsules (EPA only as the core material), (b) is a PDMS coating with DCF microcapsules, (c) is a PU coating with DCF microcapsules, and (d) is a DCF indicating coating system comprising epoxy resin EPON™ 813, amine-curing agent EPIKURE™ 3233, and DCF indicating microcapsules. The microcapsules were kept at about 10 wt % for each coating, and the scratched regions are labeled in the photos. As can be readily seen in the images, only the simultaneous presence of both DCF species and free and/or residual amine groups provided autonomous damage indication.

Example 10—Indication Performance of DCF Microcapsules in Commercial Paint

Figure 17:
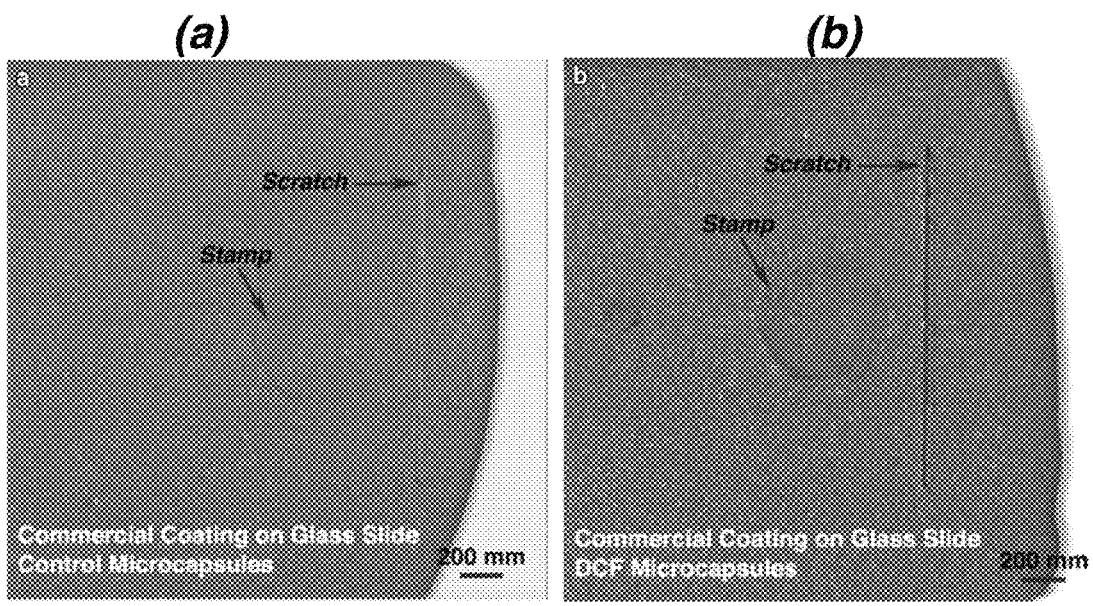
FIG. 17 shows images of control and DCF microcapsule coatings that have been subjected to scratch and impact damages.

We similarly examined coatings with DCF microcapsules that were added to a gray colored commercial epoxy coating (INTERGARD™ 251 Epoxy Primer, International Paint). FIG. 17 shows optical images of (a) a control coating comprising non-indicating microcapsules and (b) DCF indicating microcapsules in the commercial coating matrix. The indicating performances of the DCF microcapsules subjected to both scratch and impact damages were successfully demonstrated. The DCF indicating system was highly stable.

Scratched coatings were imaged and the color intensities in all regions were starkly visible compared to the control coating.

Example 11—Long-Term Stability Before and after Damage of the Smart Coating

Figure 18:
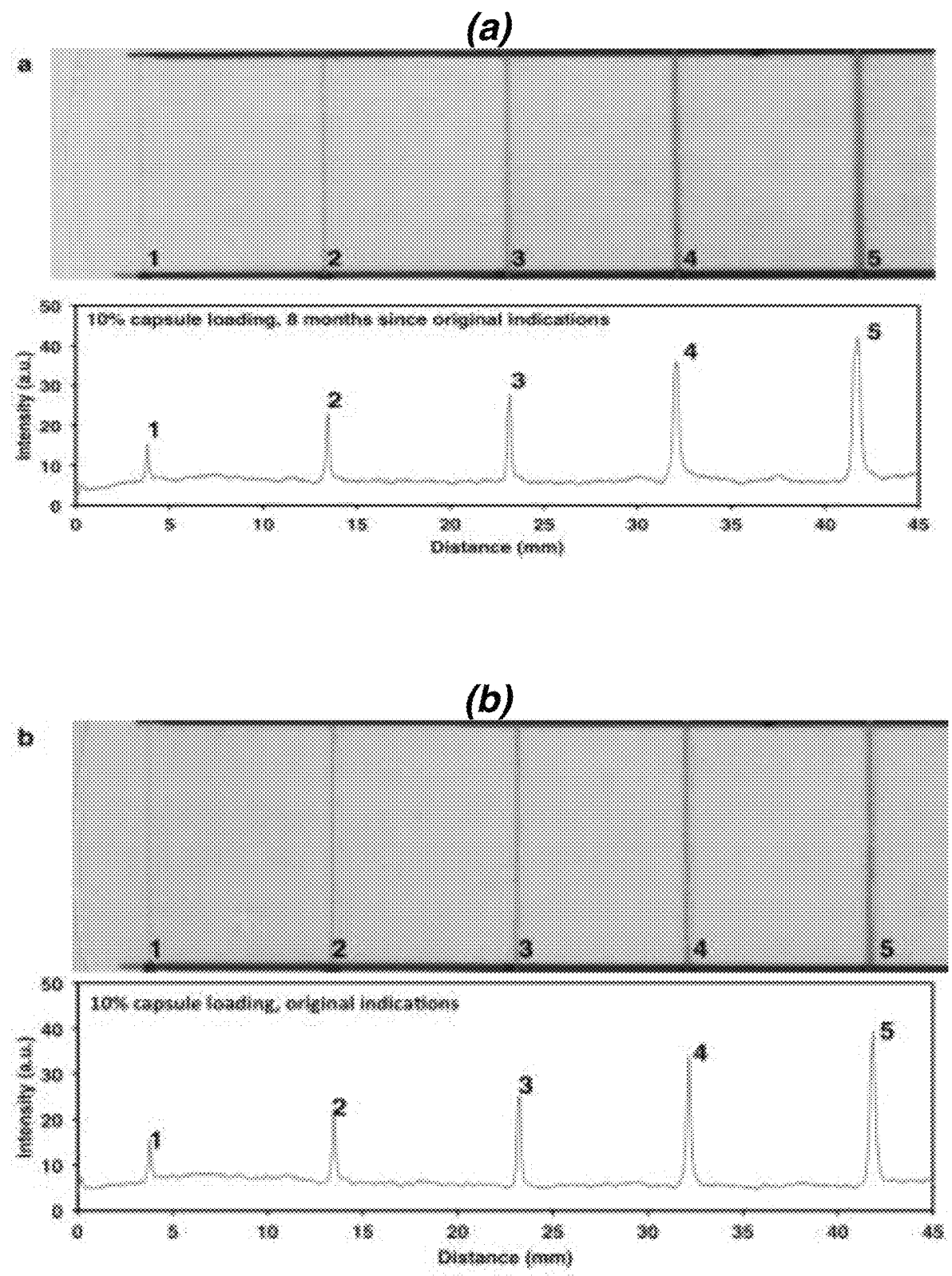
FIG. 18 shows photos and color intensity profiles of an epoxy coating having about 10 wt % DCF microcapsule concentration before and after the scratched coating was stored for a period of time.

FIG. 18 shows the long-term stability of the autonomous damage indication in DCF microcapsule-embedded epoxy coating. In (a) of the figure, the photo and color intensity of an epoxy coating stored for over 8 months at room temperature is shown. In (b) of the figure, the photo and color intensity of an epoxy coating after initial scratch damage is shown. The DCF microcapsule concentration was 10 wt %. The depths of the scratches continuously increase moving from left to right. These results show that the DCF indicating system is highly stable. Scratched coatings stored for over 8 months were imaged again and no change in color intensity was observed at either damaged or intact regions. New scratches were then made to undamaged locations, and the autonomous indication was equivalent in intensity to those carried out 8 months previously.

Example 12—Dual DCF/Amine Microcapsules

Figure 19:
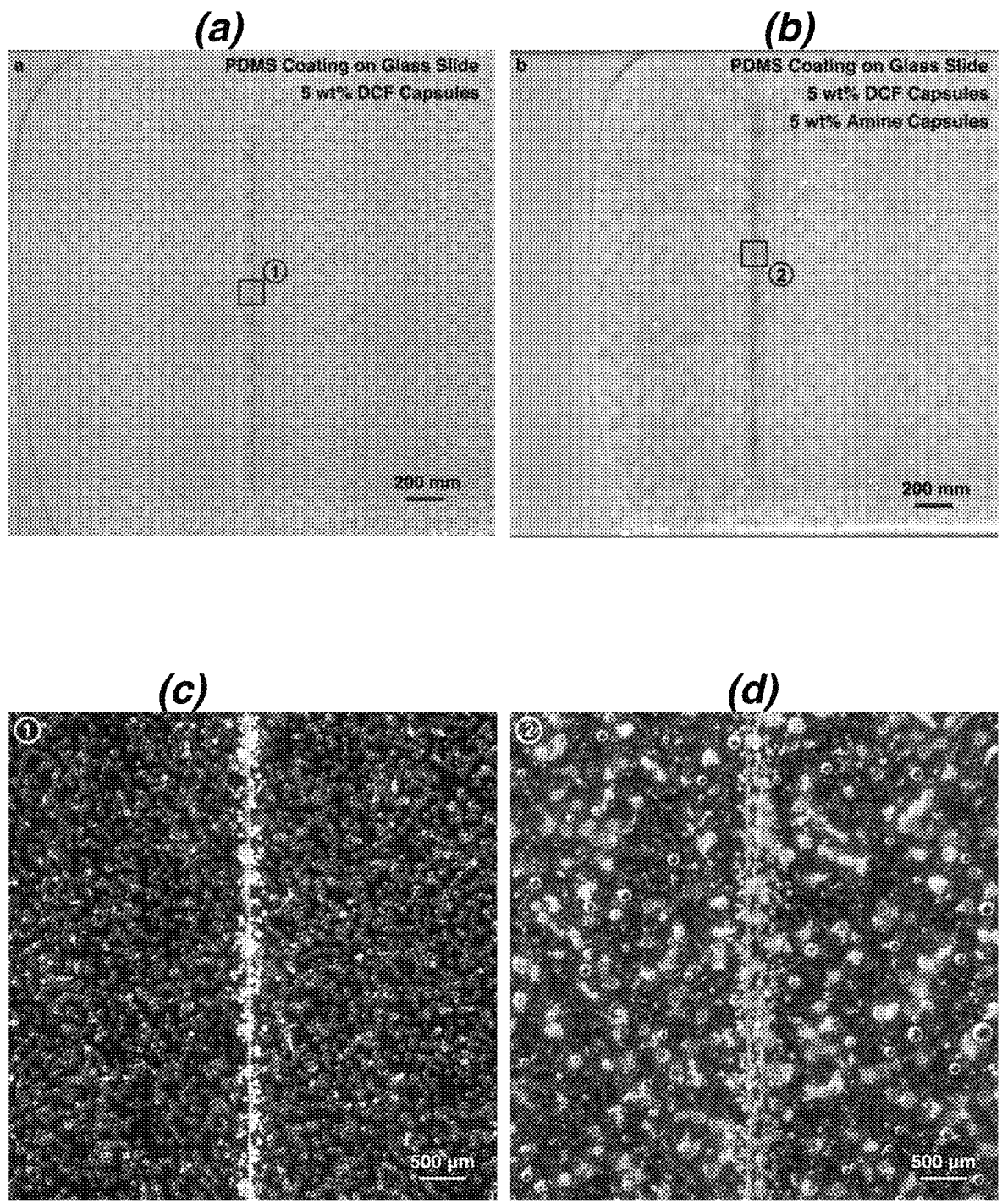
FIG. 19 shows images of control and dual-microcapsule systems.

In another embodiment, we investigated a dual-microcapsule system for autonomous damage indication, comprising DCF microcapsules and microcapsules containing primary amines. The dual-capsule system is useful for coatings lacking an excess of (unreacted) amine functionality. The addition of amine-containing microcapsules enables damage indication in coatings without (free and/or residual) unreacted amines available in the matrix polymer (e.g., a non-epoxy coating). FIG. 19 shows the damage induced color change in a polydimethylsiloxane (PDMS) coating containing both DCF and amine microcapsules (containing EPI-KURE™ 3233 (polyoxypropylene triamine)). FIG. 19 shows (a) about 5 wt % DCF microcapsules in a PDMS coating on a glass slide as a reference, and (b) about 5 wt % DCF microcapsules and about 5 wt % amine microcapsules (e.g., dual-microcapsule system) in a PDMS coating on a glass slide. Closer views under microscope of regions 1a and 2b in the figure are provided in (c) and (d), respectively. As can be readily seen in the figure, the dual-capsule system exhibited high indicating intensity and excellent stability.

Example 13—Damage Indication in a Multi-Layer Coating System

Figure 20:
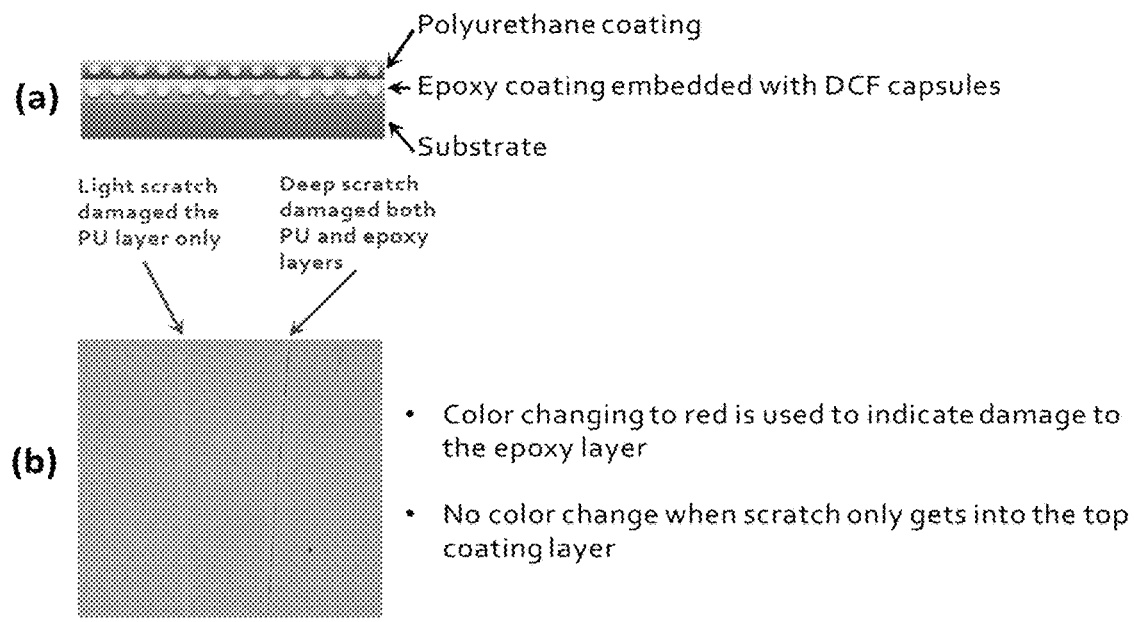
FIG. 20 shows a schematic of a multi-layered coating system containing an epoxy coating embedded with DCF microcapsules and an image of the system after having been subjected to light and deep scratch damage.

An epoxy coating embedded with DCF capsules was coated on a substrate. A polyurethane (PU) coating was then coated on top of the epoxy coating to form a multi-layered coating system. The schematic of the coating structure is shown in (a) of FIG. 20. The coatings were then subjected to light and deep scratches. The light scratch only damaged the top PU layer, and no color change was observed. The deep scratch, however, damaged both the PU and epoxy layers, and the color in the scratched area turned to red. Thus, when DCF microcapsules were embedded in the second layer from the top, a deep scratch that damaged the top two layers generated a color change, while a gentle scratch that only went into the top layer did not initiate a color change. The light and deep scratches and the color change can be seen in (b) of FIG. 20. This experiment demonstrates that the damage depth can be quantified in multi-layer coating systems by incorporating the DCF microcapsules selectively into different layers.

Example 14—Vascular Delivery System

Figure 21:
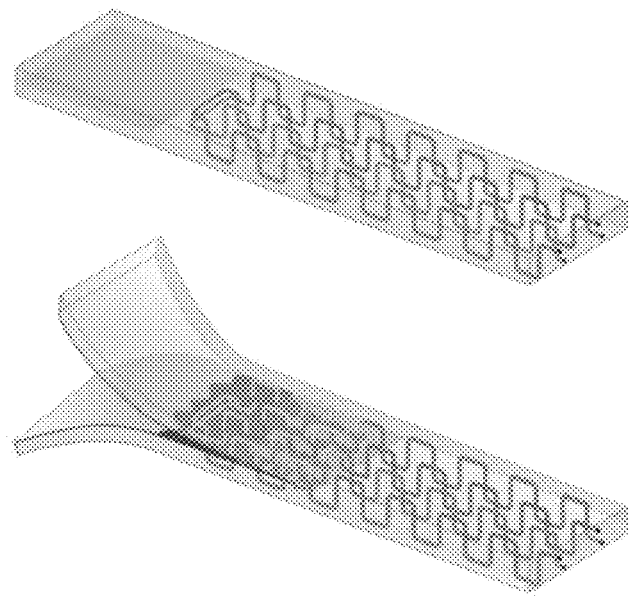
FIG. 21 shows a dual-channel microvascular network delivery system for an epoxy coating where one channel contains a DCF solution and the other channel contains a liquid amine.

So far, we have exemplified single and dual component microcapsule systems for delivering a damage-reporting agent. There are other ways to deliver a reporting agent. For instance, another embodiment utilizes a dual-channel (micro)vascular network delivery system containing a color reporting agent and a base liquid (e.g., an amine). In general, a polymer coating or composite can be fabricated with a (micro)vascular network (e.g., polymer matrix has hollow channels to hold liquids) as is illustrated in FIG. 21. Two kinds of liquids (e.g., (i) a color indicator dissolved in solvent and (ii) an amine) fill two separate channels. For example, in one embodiment, a DCF/EPA solution fills one set of channels and an amine-curing agent (e.g., EPI-KURE™ 3233) fills another set of channels. An undamaged two-channel system isolates one channel from the other. Then, when mechanical damage is inflicted on an area of the system, the channels in the damaged area are breached and locally release the liquids contained therein so that they come in contact with one another in the damaged area. Color reaction is generated upon the mixing of the two liquids in the damaged area to indicate the presence of damage. Note that in the DCF indicator embodiment, the polymer matrix is precluded from having a significant amount of unreacted (free and/or residual) amines to avoid unintended color indication.

In other embodiments of the vascular delivery system, additional channels can be added to the (micro)vascular network to hold additional functional agents, such as self-healing agents and color reporting agents of self-healing being accomplished. In yet another embodiment, a combination of the (micro)vascular network and microcapsule systems described herein provide multiple options to autonomically indicate damage, repair damage, and indicate repair has been accomplished.

Example 15—DCF Versus Other pH-Sensitive Dyes (i) Dye Characterization

DCF is a pH-sensitive dye. The DCF indication mechanism results from a chemical reaction under alkaline conditions. Specifically, when the DCF indicator that is encapsulated in microcapsules is released by mechanical damage, the alkaline condition of the environment (e.g., provided by unreacted amines in a polymeric matrix or amine-filled secondary microcapsules) initiates a color-changing event.

We tested DCF versus a group of pH-sensitive dyes under the following two criteria: (1) a sharp color change can be triggered by mild alkaline conditions; and (2) the color indicator is oil-soluble and water-insoluble so that it can be readily encapsulated. In one embodiment, it is desirable that the indicator color change is triggered by a mild basic environment provided by amine-cured epoxies. In such a case, no additional additive is required to initiate the indication. In another embodiment, it is also desirable that the initial color of the indicator at the encapsulation stage is relatively light to provide a minimum background color and greater contrast to the vibrant color of the damage indication. Table 1 contains a list of the dyes tested and the results.

TABLE 1

| Dye | Criteria 1 Color Change by Amine | Criteria 2 Suitability for Encapsulation |
|---|---|---|
| 2',7'-Dichlorofluorescein (DCF) | Light Yellow → Bright Red | Excellent |
| Bromo phenol blue (BPB) | Yellow/Green → Blue | Excellent |
| Congo Red | No | Possible |
| Crystal Violet Lactone | No | Possible |
| Genacryl Pink G | Purple → Clear (not a "turn-on" indication) cannot trigger by residual amine | Good |
| Perylene | No | Possible |
| Umbelliferone | No | Ok |
| Thymol blue | Color change cannot be triggered by residual amine | Poor solubility |
| Bromocresol purple | Color change cannot be triggered by residual amine | Ok |
| Bromothymol blue | Color change cannot be triggered by residual amine | Ok |
| Neutral red | Red → yellow Questionable to trigger by residual amine | Poor oil solubility |
| Thymolphthalein | Color change cannot be triggered by residual amine | Questionable |
| Fluorescamine | No fluorescence → strong blue fluorescence under UV light | Excellent |

Color changes for the dyes were tested under two alkaline conditions: (1) dye exposure to unreacted (residual and/or free) amines present in an amine-cured epoxy coating (Amine-cured epoxy specimens as described above were prepared for testing the dyes of Table 1); and (2) dye exposure to the addition of a liquid amine. Under criteria 1, 'no' means that no color change was observed with the addition of a liquid amine, while 'color change cannot be triggered by residual amine' means that no color change was observed when the dye was exposed to the unreacted amines of a cured epoxy coating, but color change was observed when a liquid amine was added. These findings show that the addition of a liquid amine provides a stronger alkaline environment compared to the mild alkaline environment provided by residual and/or free amines of the coating.

2',7'-dichlorofluorescein (DCF), bromophenol blue (BPB) and fluorescamine were the only three dyes tested that were suitable for damage detection based on the above criteria. Genacryl pink G provided a color change from purple to clear when exposed to a liquid amine. This is 'turn-off' indication (rather than a 'turn-on' indication), which means it would be difficult to observe small 'color off' regions with this dye as an indicator in a strongly colored background. Further, genacryl pink G was not triggered by an unreacted amine of a cured epoxy coating. While neutral red provided a color change upon exposure to an amine, it possessed poor oil solubility and relatively good water solubility, which means it could not be readily encapsulated. The other examined dyes did not satisfy both criteria, and therefore, are not very suitable for the described microcapsule based systems. For the (micro)vascular delivery system, any vibrant color change that can be triggered by reacting with liquid amines would be suitable for self-indicating.

(ii) BPB Testing

Figure 22:
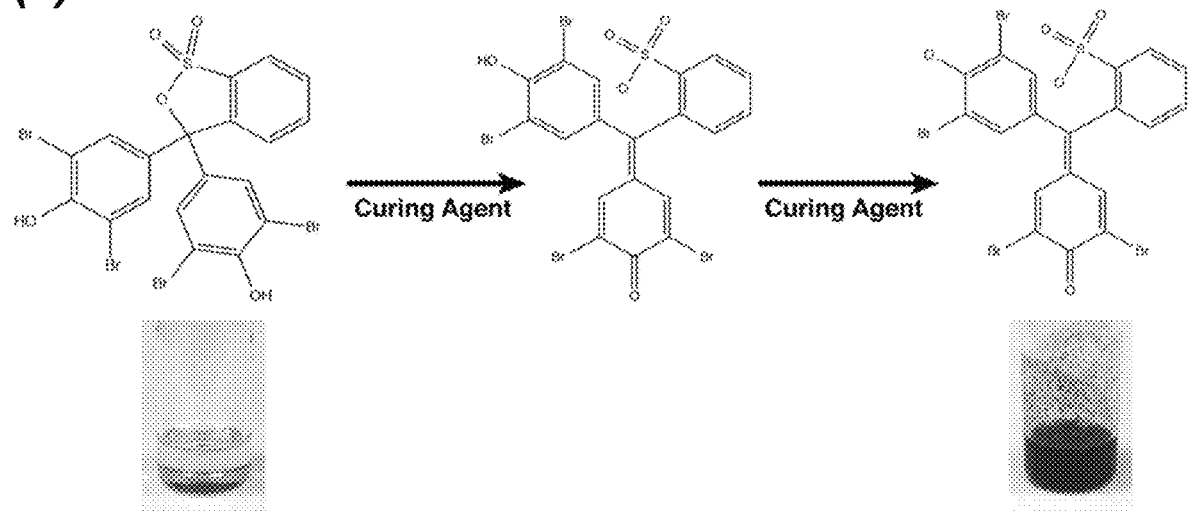
FIG. 22 shows the chemical reaction of BPB and an amine and an image of a ruptured BPB microcapsule embedded in a coating that has been subjected to damage.
Figure 22:
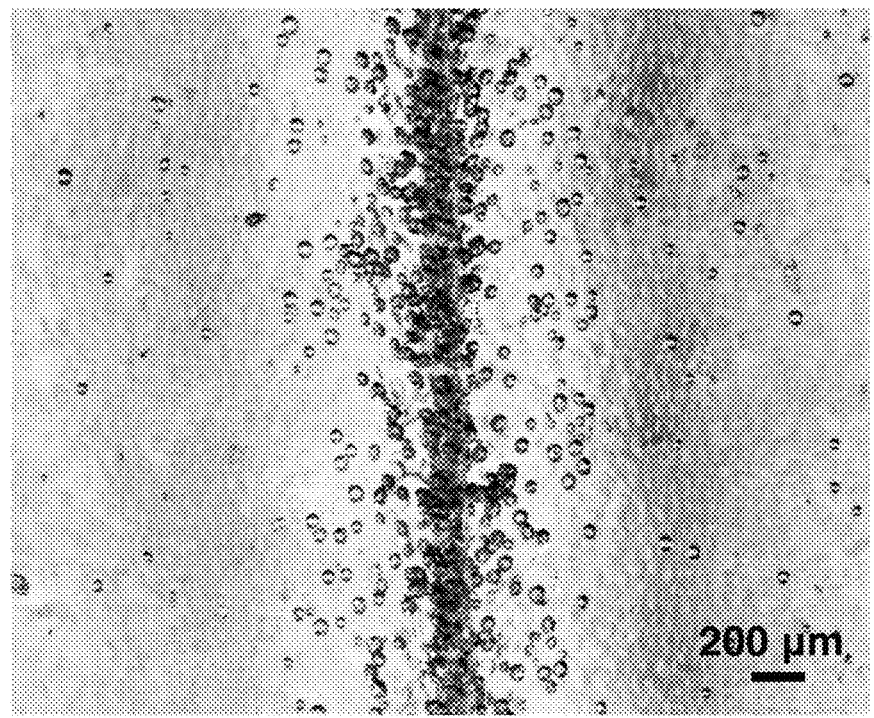

In (a) of FIG. 22, the chemical reaction of BPB and polyoxypropylene triamine is shown. Like with DCF, BPB is soluble in EPA. A BPB/EPA solution is initially light yellow in color, but changes into an opaque blue suspension almost immediately after coming into contact with a base, such as an amine. As can be seen in the images adjacent to the molecular structures of BPB before and after being exposed to an amine-curing agent in (a) of the figure, adding one drop of polyoxypropylene triamine (EPIKURE™ 3233, Hexion) to a BPB/EPA solution changed the solution from light yellow (acid form) to deep blue (base form). In (b) of FIG. 22, an image is shown of ruptured BPB microcapsules dispersed in a cured epoxy resin that possesses free and/or residual amines and has been subjected to damage. A vibrant blue color can be seen in the damaged region, in contrast to a light yellow color seen in the undamaged regions.

(iii) Fluorescamine Testing

Fluorescamine is originally a white, non-fluorescent probe that selectively becomes irreversibly fluorescent in the presence of primary amines. Our damage sensing epoxy coating contained a separately microencapsulated amine sensitive fluorescent indicator agent (fluorescamine) in a solvent (e.g. EPA) and an amine-based curing agent (EPIKURE 3233). Once the coating was damaged, the encapsulated indicator and curing agents release and mix together in the damage region. When reacted with a primary amine, fluorescamine reached maximum fluorescent intensity in less than a minute, indicating exactly where the damage has occurred.

Figure 23:
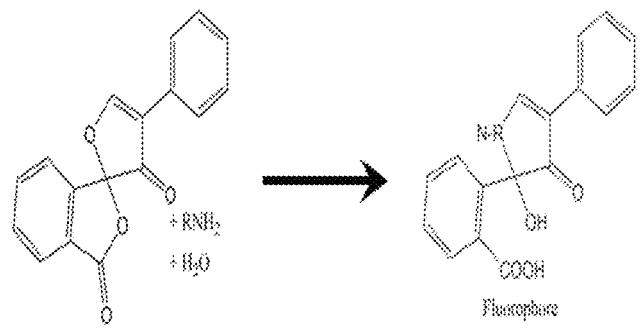
FIG. 23 shows the chemical reaction of fluorescamine and an amine and images of damaged coatings and composites containing fluorescamine-containing microcapsules and amine-containing microcapsules.
Figure 23:
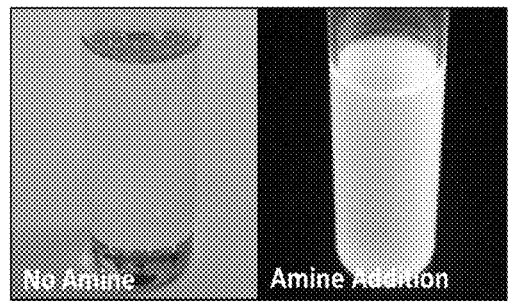
Figure 23:
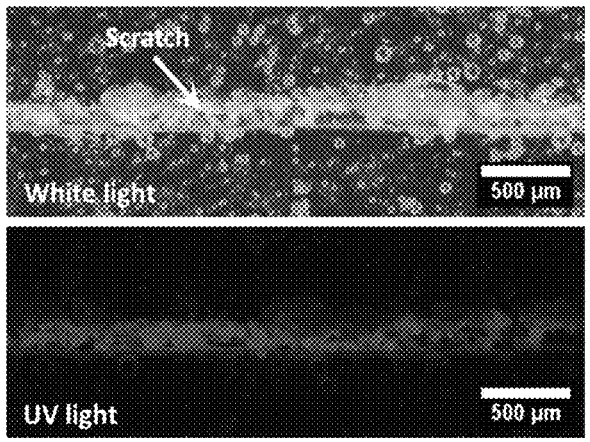
Figure 23:
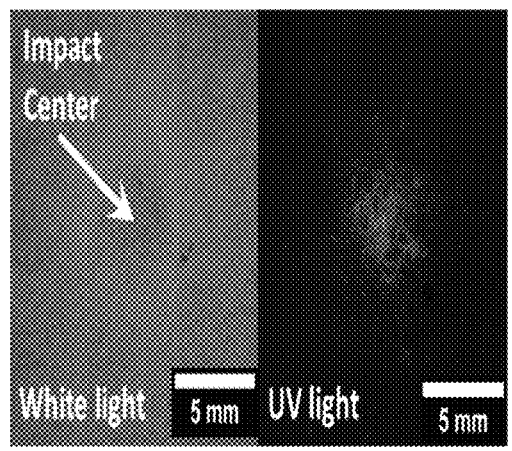

In (a) of FIG. 23, the chemical reaction of fluorescamine and an amine is shown. Like with DCF and BPB, fluorescamine is soluble in EPA. As shown in (b) of FIG. 23, a fluorescamine/EPA solution is initially clear and non-fluorescent under UV light, but exhibits bright blue fluorescence under UV light almost immediately after reacting with an amine. Dual microcapsule-embedded epoxy coatings were prepared by incorporating fluorescamine-containing microcapsules and amine-containing microcapsules into an epoxy matrix. In (c) of FIG. 23, photos taken under white light and UV light are shown of damaged coatings embedded with fluorescamine-containing microcapsules and amine-containing microcapsules. Once the coating has been damaged, the encapsulated indicator and curing agents are released and mixed in the damage region, generating a vibrant blue fluorescence under UV light.

As shown in (d) of FIG. 23, glass-fiber reinforced composite specimens with an epoxy coating incorporating fluorescamine microcapsules and amine microcapsules were subjected to impact tests, and the resulting damage, which was not quite clear under white light, was clearly discernible under UV light. Accordingly, other embodiments of the invention include all the indicator systems exemplified above, except that BPB or fluorescamine is used in place of DCF as the reporting agent.

In summary, the above examples have demonstrated a self-reporting polymeric coating or composite capable of indicating cracks as small as about 10 microns in width. DCF, BPB and fluorescamine were successfully encapsulated and dispersed into several types of polymeric coatings. In epoxy coatings, the DCF indicator agent released by mechanical damage was able to react with free and/or residual amines in the coating matrix, creating a highly localized red color in the cracked region. The BPB indicator agent produced a highly localized blue color in the cracked region. The fluorescamine indicator agent exhibited a bright blue fluorescence under UV light after reaction with an amine.

In another embodiment of the invention, through the addition of a second type of microcapsule containing a base, such as a primary amine, autonomous damage indication was also achieved in non-epoxy coatings. In yet another embodiment of the invention, a microvascular delivery system employing separate channels of color indicator and base can also autonomously indicate damage. In all the systems, the indicating color change was fast, vibrant, easy to detect and highly stable. Other embodiments of the invention combine the ability to autonomously detect virgin damage with self-healing functionality and a secondary indication that can reveal that crack healing has occurred. The system can autonomously detect and indicate damage, self-heal the damage, and detect and indicate that the damage has been healed.

What is claimed is:

1. An autonomic self-indicating material comprising a polymer composition and a plurality of first and second microcapsules having an outer shell and one or more agents comprising a first color indicator and a base encapsulated therein, the first microcapsules comprising the first color indicator, and the second microcapsules comprising the base, where a self-indicating process is autonomically initiated when a region of the material is sufficiently damaged to induce rupturing of one or more of the first and second microcapsules, which release the first color indicator and the base in and/or around the damaged region where the first color indicator and the base react together to form a first colored product in and/or around the damaged region, and wherein the first color indicator comprises 2',7'-dichlorofluorescein (DCF), bromophenol blue (BPB) or fluorescamine.

2. A method of autonomically self-indicating damage in a material after it has been sufficiently damaged, comprising preparing an autonomic self-indicating material prior to the damage being inflicted upon a region of the material, and observing a first colored product in and/or around the damaged region after the damage has been inflicted, wherein the autonomic self-indicating material comprises a polymer composition and a plurality of first and second microcapsules having an outer shell and one or more agents comprising a first color indicator and a base encapsulated therein, the first microcapsules comprising the first color indicator, and the second microcapsules comprising the base, where a self-indicating process is autonomically initiated when a region of the material is sufficiently damaged to induce rupturing of one or more of the first and second microcapsules, which release the first color indicator and the base in and/or around the damaged region where the first color indicator and the base react together to form a first colored product in and/or around the damaged region, and wherein the first color indicator comprises 2',7'-dichlorofluorescein (DCF), bromophenol blue (BPB) or fluorescamine.

3. The material of claim 1 where the base comprises an amine or an aromatic heterocycle.

4. The material of claim 3 where the amine comprises polyoxypropylene triamine and the aromatic heterocycle comprises imidazole.

5. The material of claim 1, the one or more agents further comprising a functional agent.

6. The material of claim 5 further comprising a plurality of third microcapsules comprising the functional agent.

7. The material of claim 6 where when the self-indicating process is initiated, one or more of the third microcapsules rupture and release the functional agent in and/or around the damaged region.

8. The material of claim 5 where the functional agent comprises a self-healing agent for healing the damaged region.

9. The material of claim 5 further comprising a second color indicator.

10. The material of claim 8 further comprising a second color indicator, where when the self-indicating process is initiated, the self-healing agent heals the damaged region and the second color indicator forms a second colored product different from the first colored product in and/or around the damaged region to indicate that the damaged region has been healed.

11. The material of claim 9 where the second color indicator comprises Neutral Red dye.

12. The material of claim 9 further comprising a plurality of third microcapsules comprising the functional agent, the second color indicator or a combination thereof.

13. The material of claim 12 further comprising a plurality of fourth microcapsules comprising the functional agent, the second color indicator or a combination thereof.

14. The material of claim 1 where the material is formulated into a film coated onto a substrate.

15. The material of claim 14 where the substrate comprises a metal, ceramic, polymer or fiber-reinforced composite.

16. The material of claim 15 where the metal comprises steel.

17. The material of claim 14 where the film comprises an epoxy resin.

18. The material of claim 1 where when the self-indicating process is initiated, the damaged region has a size that is greater than or equal to 10 μm.

19. The material of claim 1 where the first color indicator has a concentration that is at least 5 wt % based on the total weight of the material.

20. An autonomic self-indicating material comprising a polymer composition and a plurality of first and second microcapsules having an outer shell and one or more agents comprising a first color indicator and an amine encapsulated therein, the first microcapsules comprising the first color indicator, and the second microcapsules comprising the amine, where a self-indicating process is autonomically initiated when a region of the material is sufficiently damaged to induce rupturing of one or more of the first and second microcapsules, which release the first color indicator and the amine in and/or around the damaged region where the first color indicator and the amine react together to form a first colored product in and/or around the damaged region, and wherein the first color indicator comprises 2',7'-dichlorofluorescein (DCF), bromophenol blue (BPB) or fluorescamine, and the first color indicator has a concentration that is at least 5 wt % based on the total weight of the material.

* * * * *